US006630917B1

(12) United States Patent
Van Dijk

(10) Patent No.: US 6,630,917 B1
(45) Date of Patent: Oct. 7, 2003

(54) SUBFIELD-DRIVEN DISPLAY

(75) Inventor: Roy Van Dijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 159 days.

(21) Appl. No.: 09/763,774

(22) PCT Filed: Jun. 23, 2000

(86) PCT No.: PCT/EP00/05892

§ 371 (c)(1), (2), (4) Date: Feb. 26, 2001

(87) PCT Pub. No.: WO01/01382

PCT Pub. Date: Jan. 4, 2001

(30) Foreign Application Priority Data

Jun. 28, 1999 (EP) .......................................... 99202080

(51) Int. Cl.[7] .............................................. H04N 3/12

(52) U.S. Cl. ....................................... 345/60; 348/797

(58) Field of Search ........................... 345/204, 60, 63, 345/37, 41, 3.2, 148; 348/701, 792, 793

(56) References Cited

U.S. PATENT DOCUMENTS 6,310,588 B1 * 10/2001 Kawahara et al. ............ 345/63
6,373,477 B1 * 4/2002 Van Dijk .................... 345/204
6,456,302 B2 * 9/2002 Kawahara et al. .......... 345/693
6,456,337 B1 * 9/2002 Kobayashi et al. ......... 348/701

FOREIGN PATENT DOCUMENTS

EP 0840274 A1 6/1997
JP 08130696 A 5/1996
JP 10039833 A 2/1998

* cited by examiner

*Primary Examiner*—Vijay Shankar
*Assistant Examiner*—Nitin Patel

(57) ABSTRACT

In a method of driving a subfield-driven display (PDP), for a position in a subfield it is examined (E) whether a motion vector for the position differs from a motion vector for a neighboring position to determine whether uncovering or covering is present. If uncovering or covering is present, a size of an area of covering and uncovering is calculated (C), and the area of covering and uncovering is filled (F) in.

19 Claims, 28 Drawing Sheets

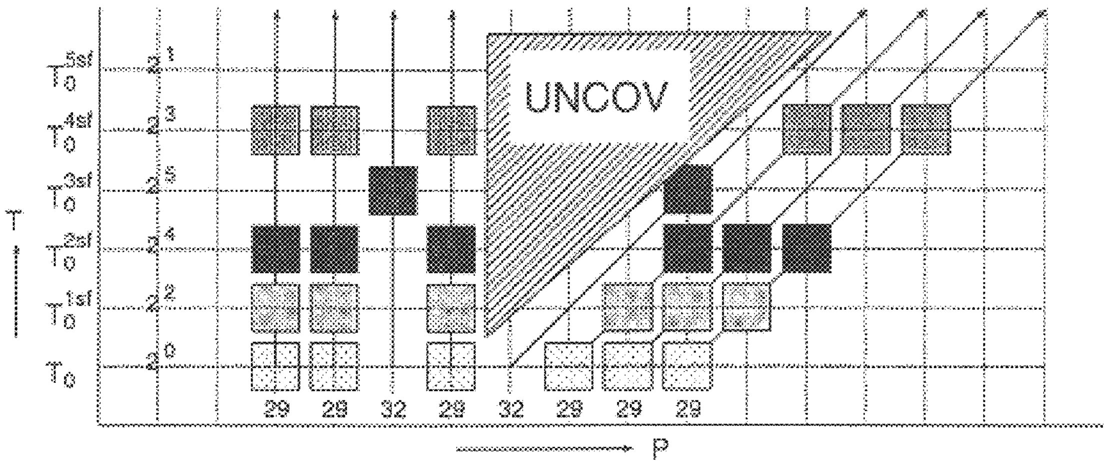
FIG.5A1
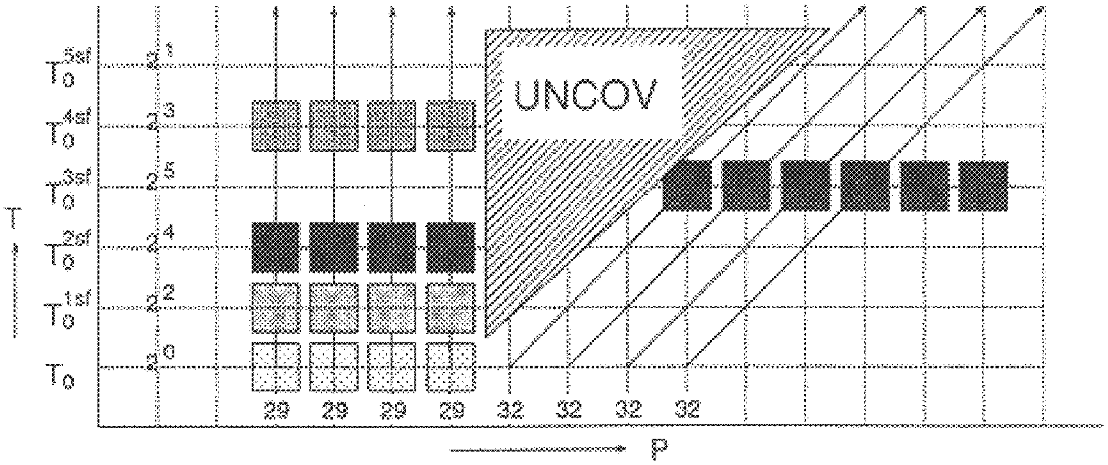
FIG.5B1
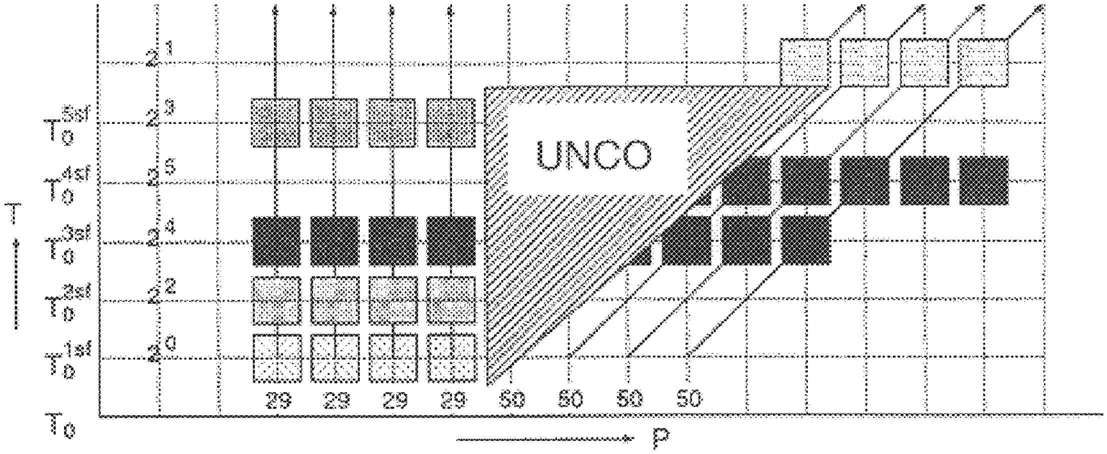
FIG.5C1

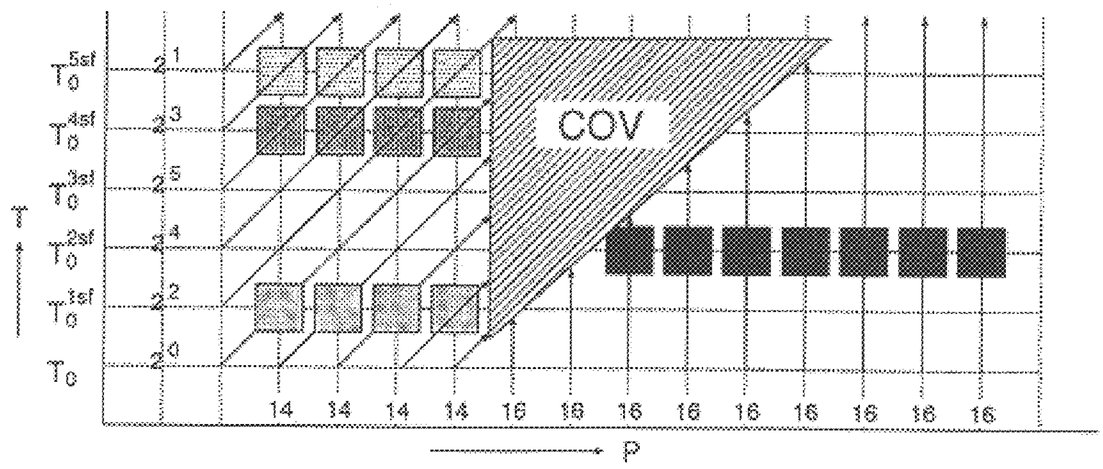
FIG.5A2
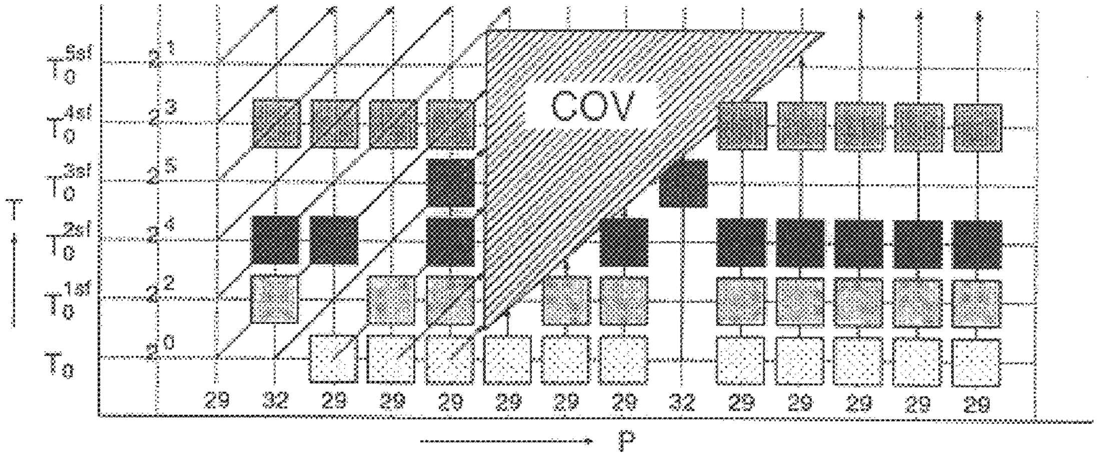
FIG.5B2
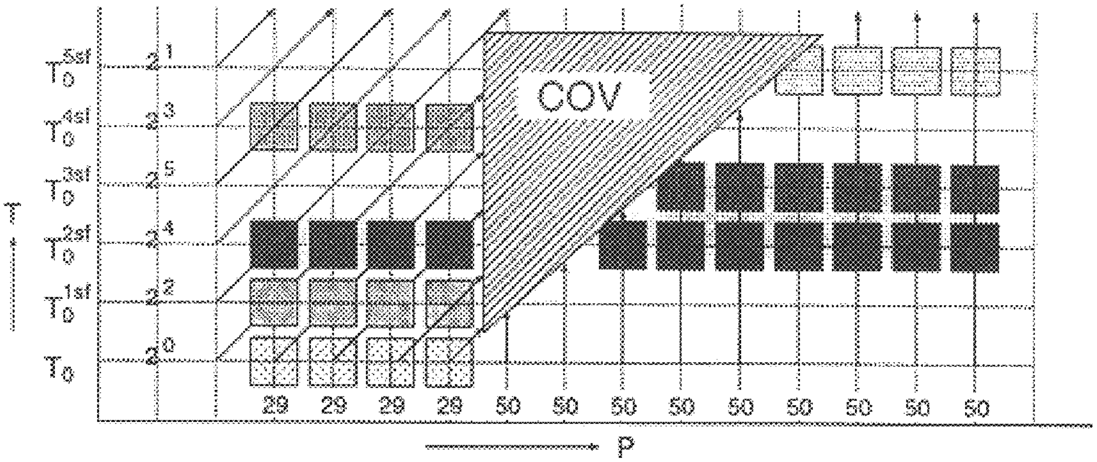
FIG.5C2

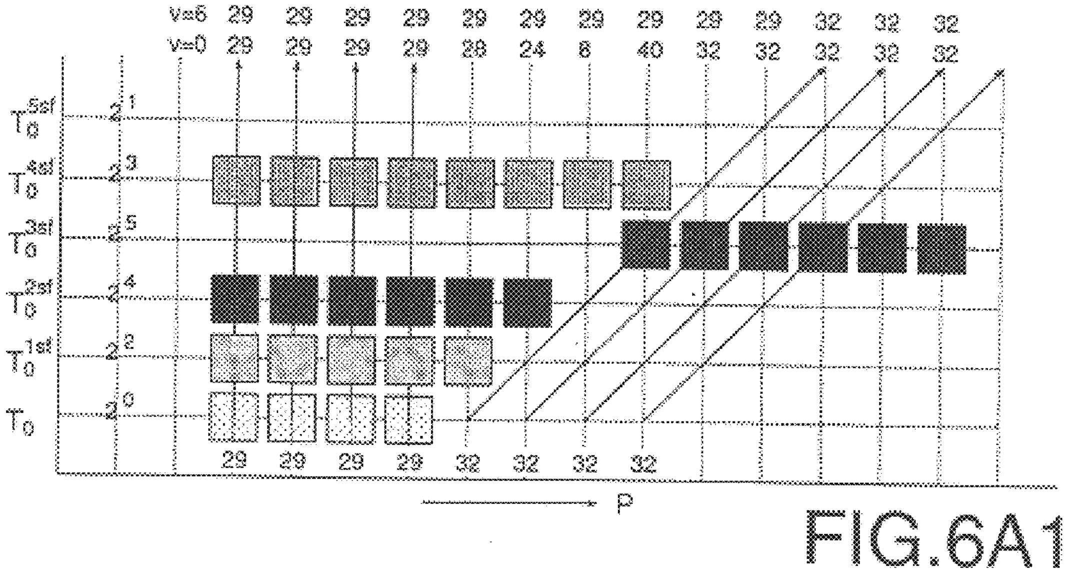
FIG.6A1
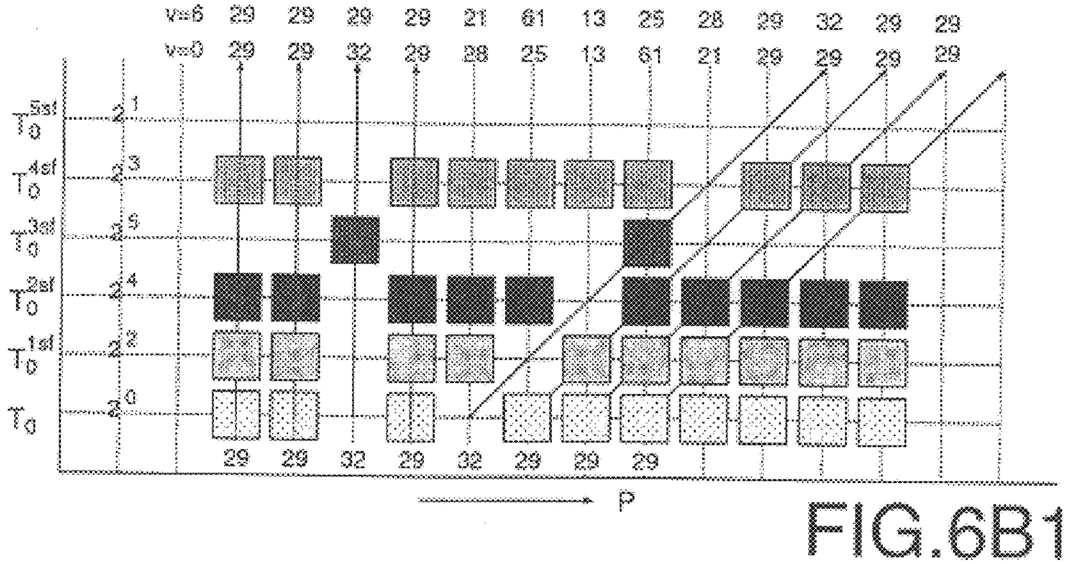
FIG.6B1
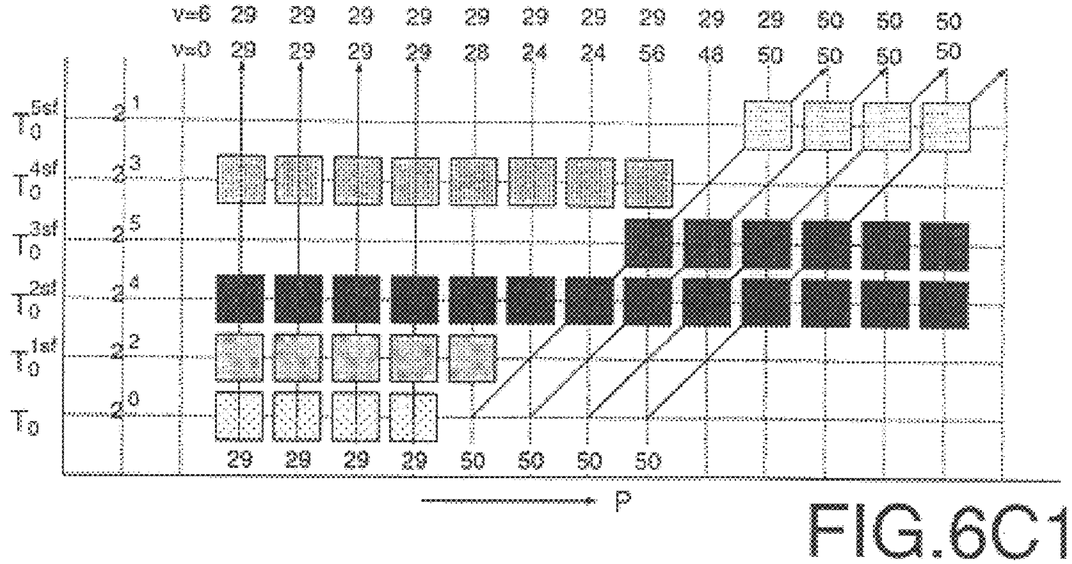
FIG.6C1

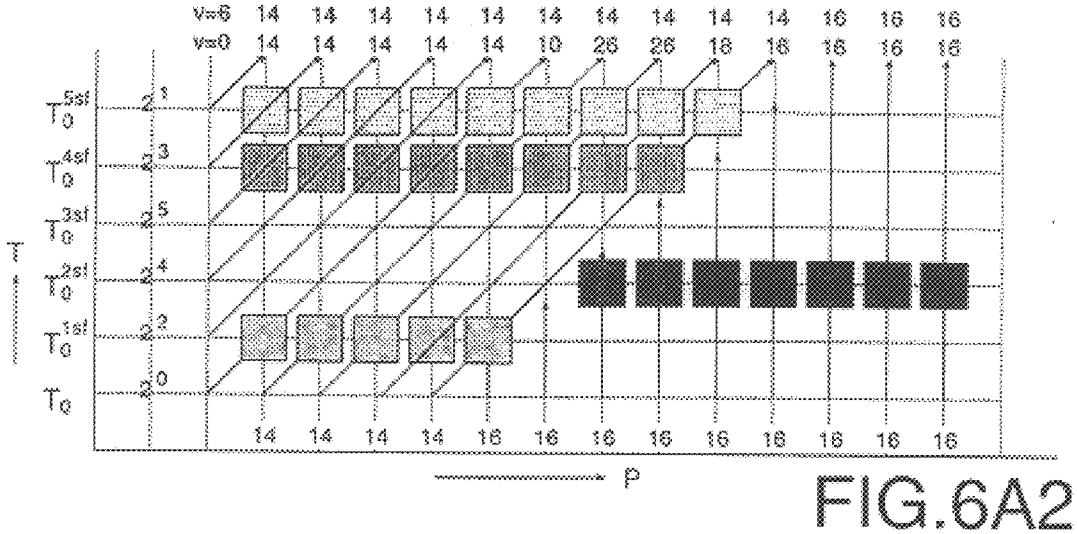
FIG.6A2
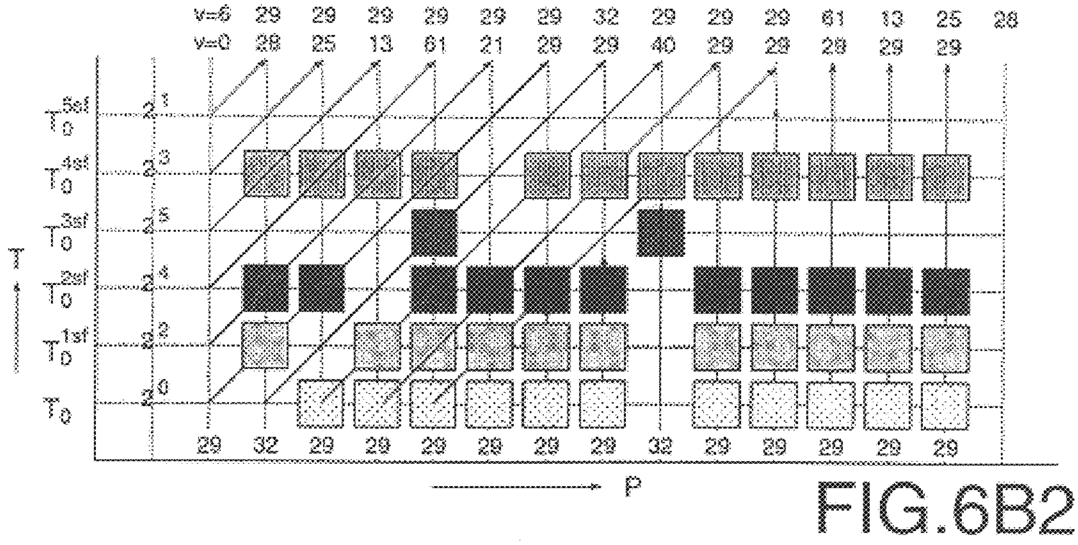
FIG.6B2
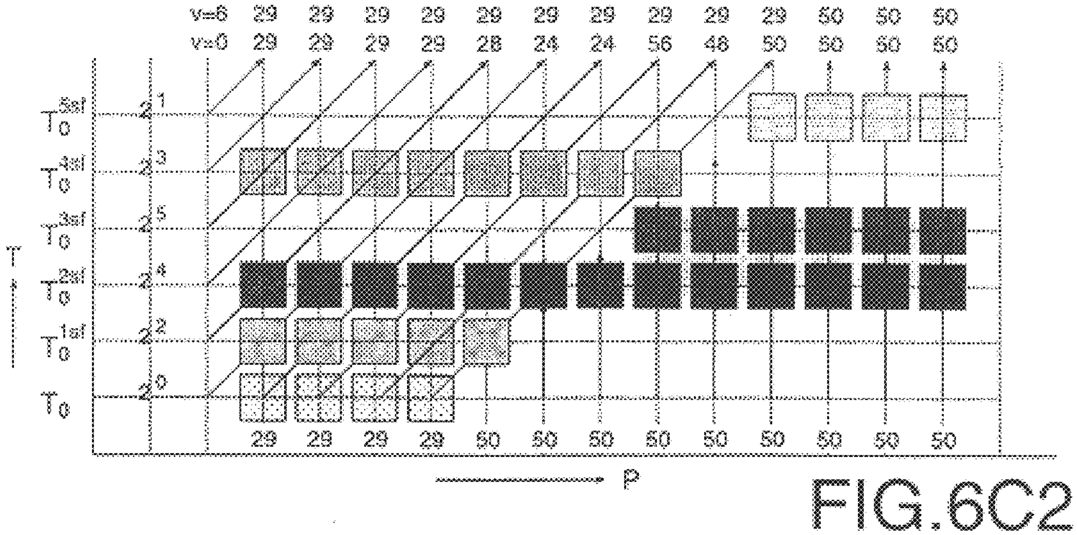
FIG.6C2

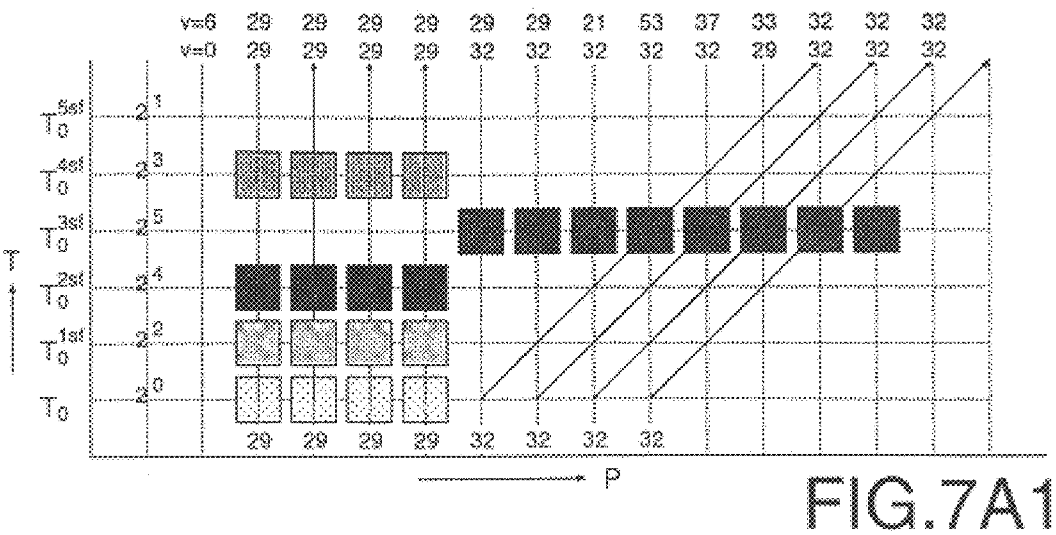
FIG.7A1
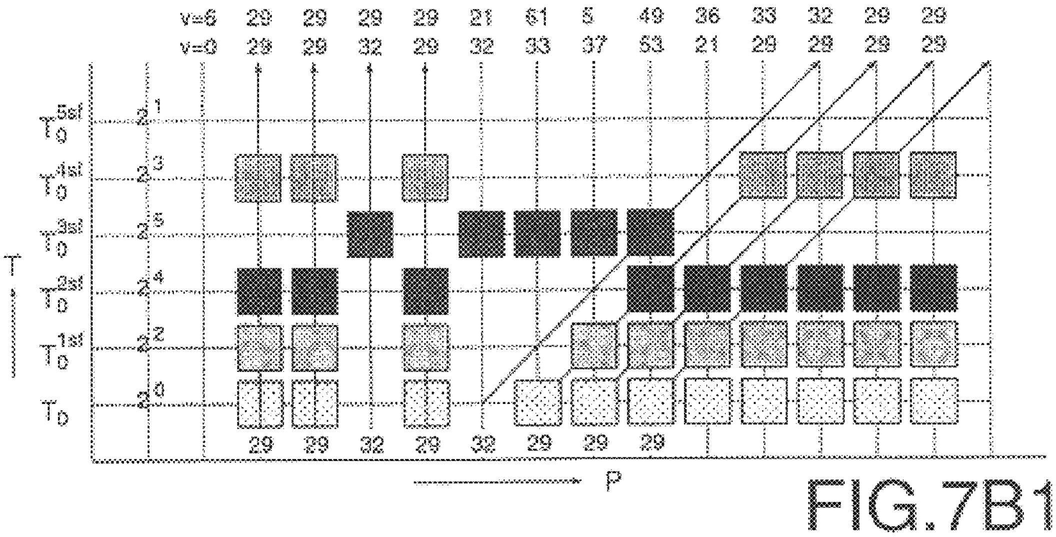
FIG.7B1
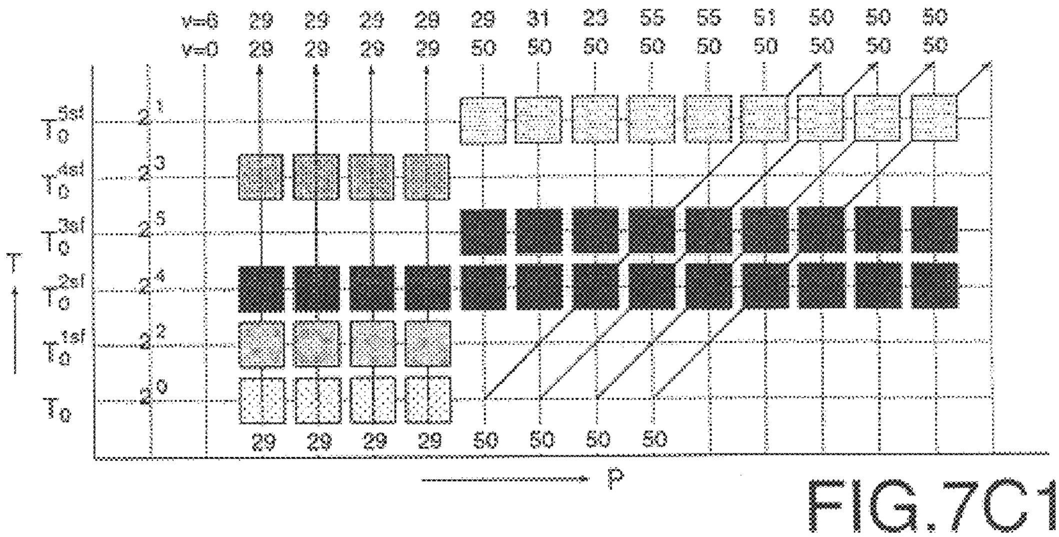
FIG.7C1

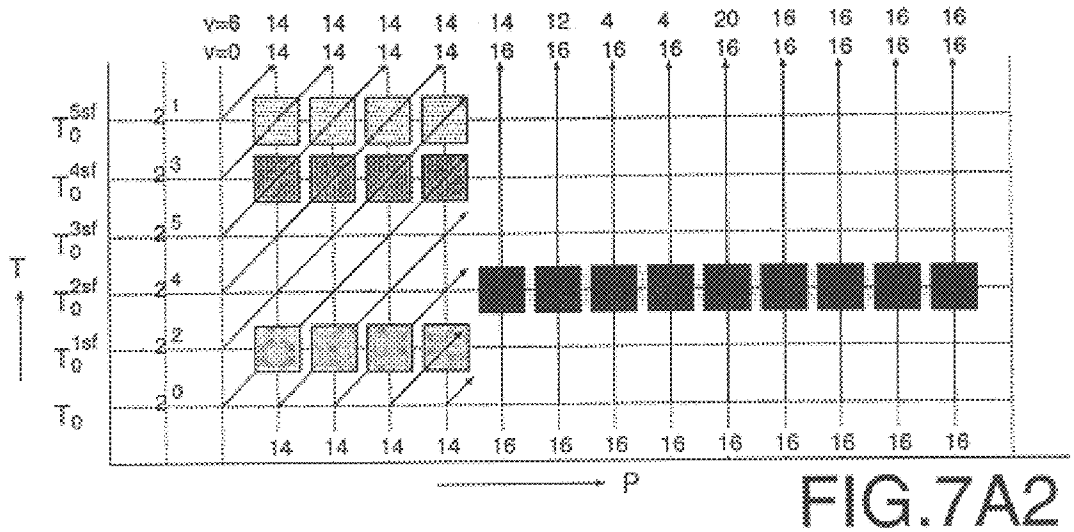
FIG.7A2
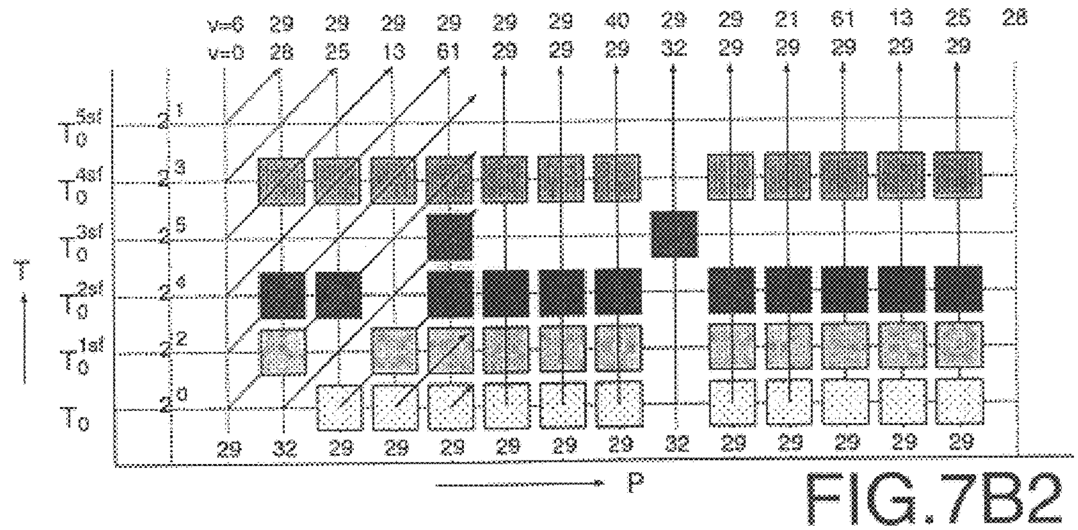
FIG.7B2
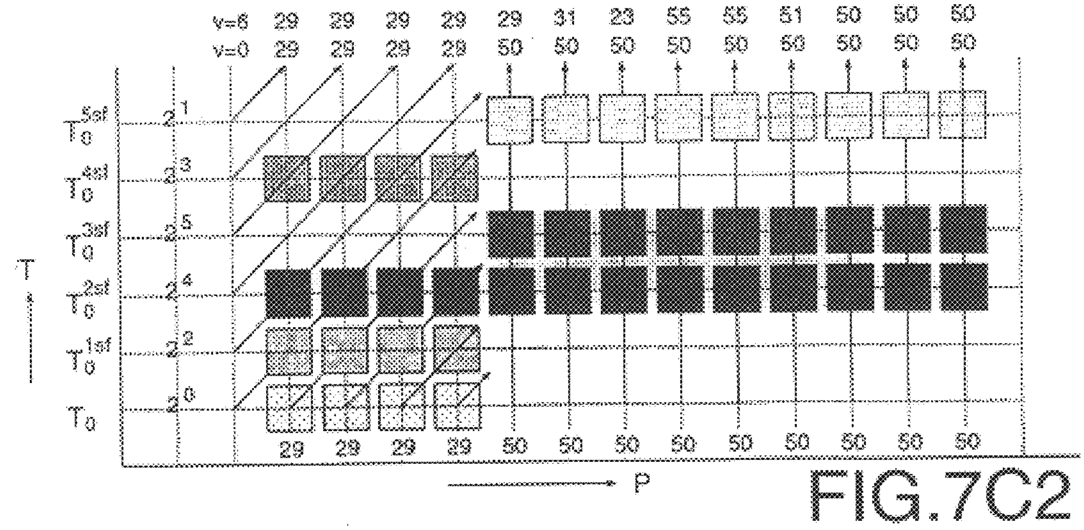
FIG.7C2

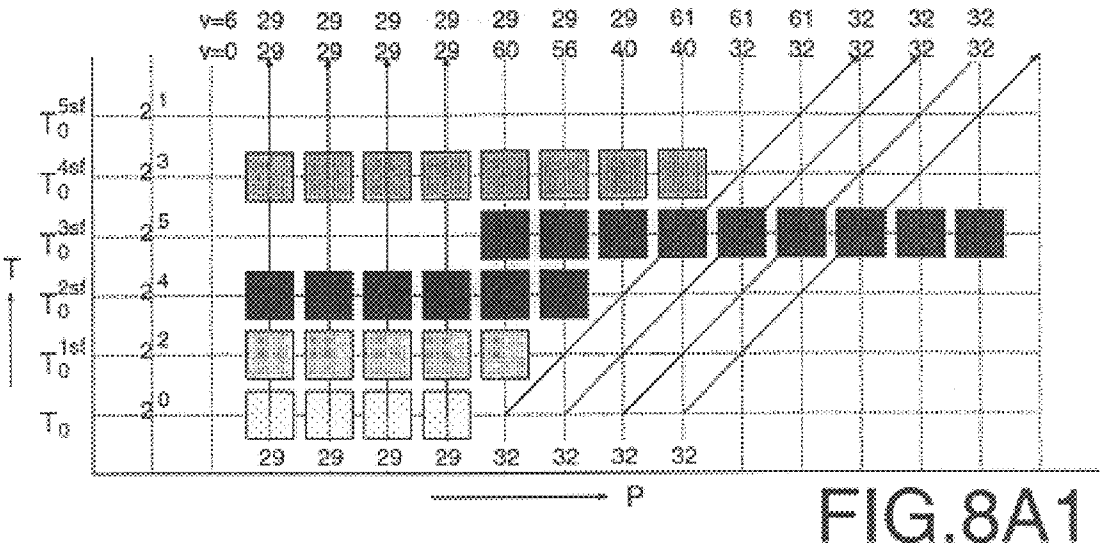
FIG.8A1
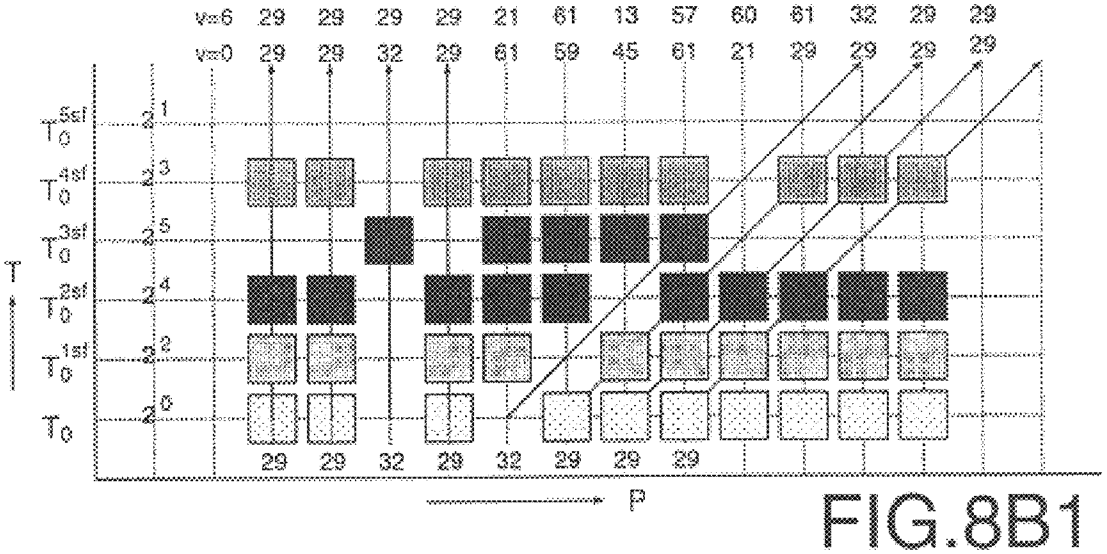
FIG.8B1
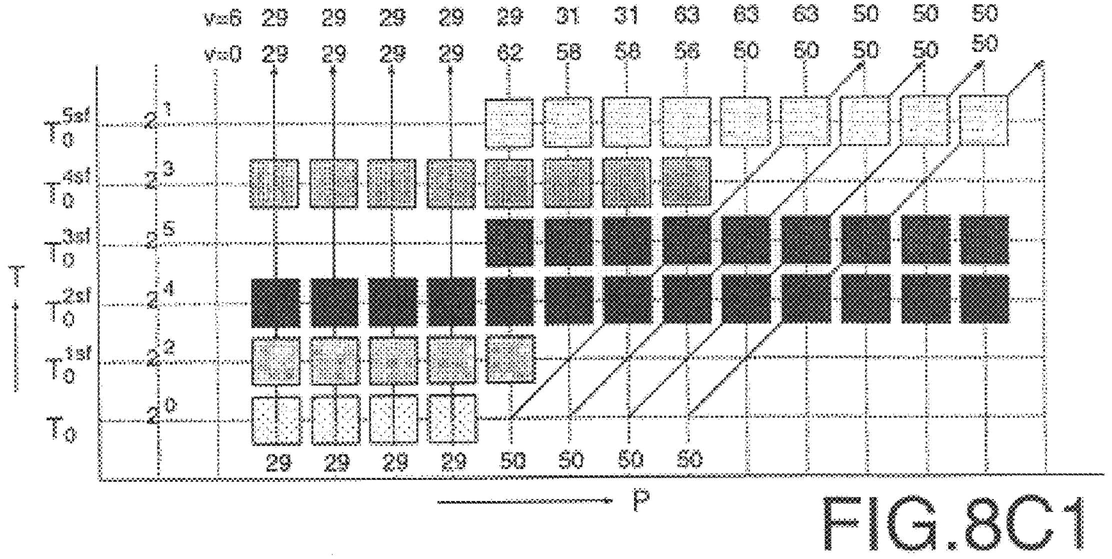
FIG.8C1

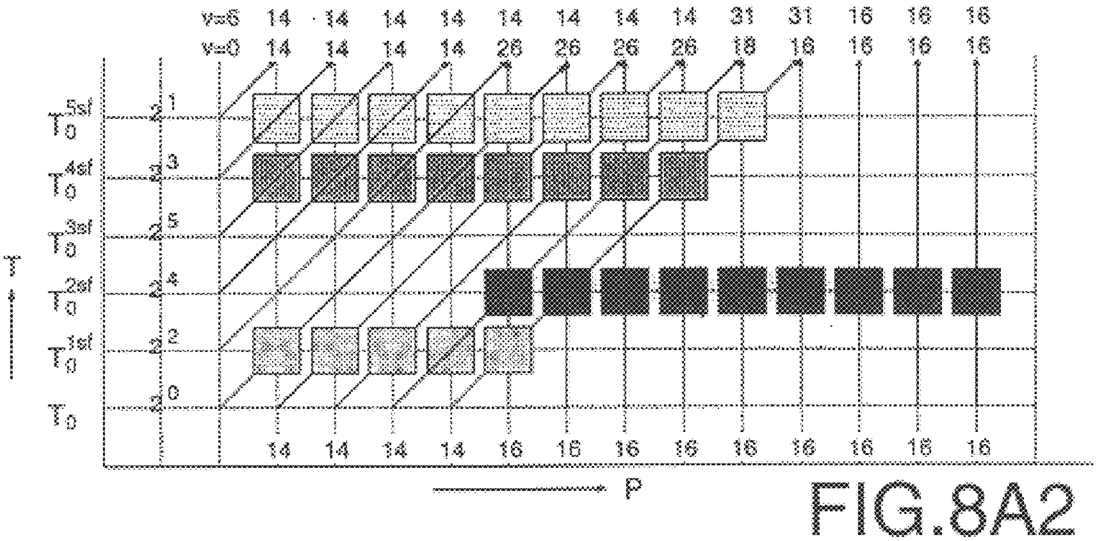
FIG.8A2
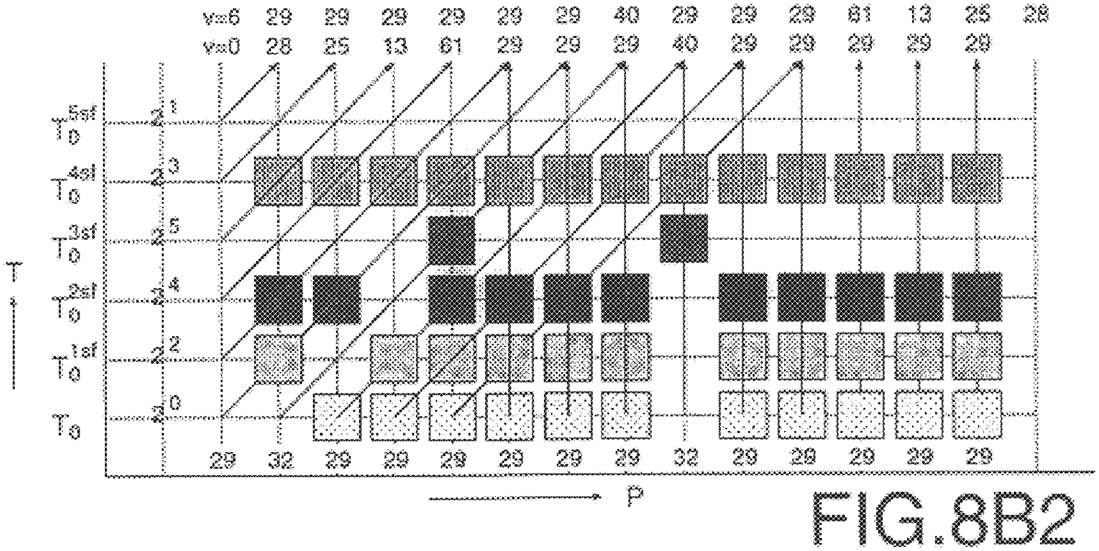
FIG.8B2
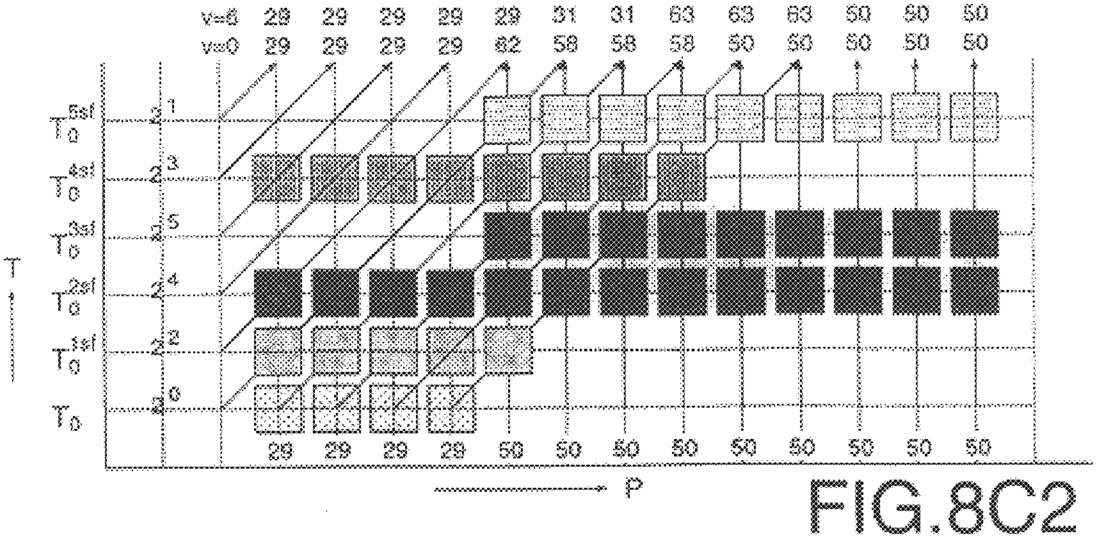
FIG.8C2

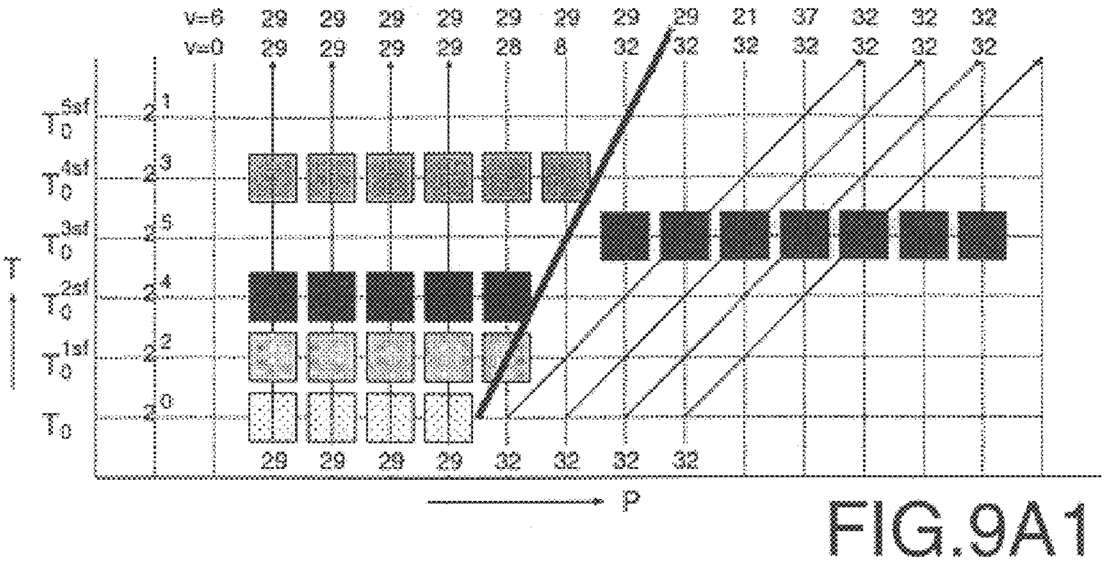
FIG.9A1
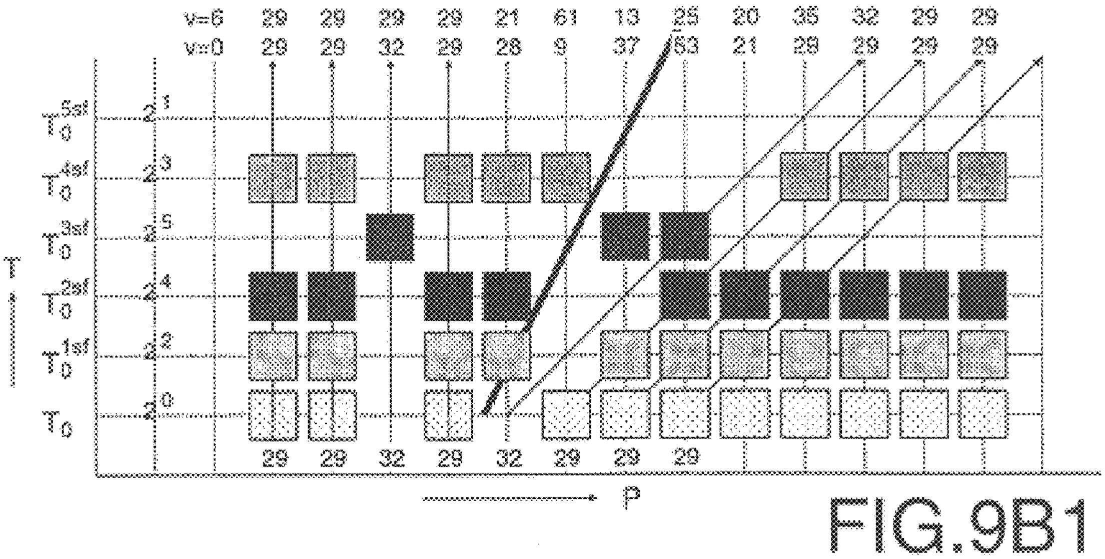
FIG.9B1
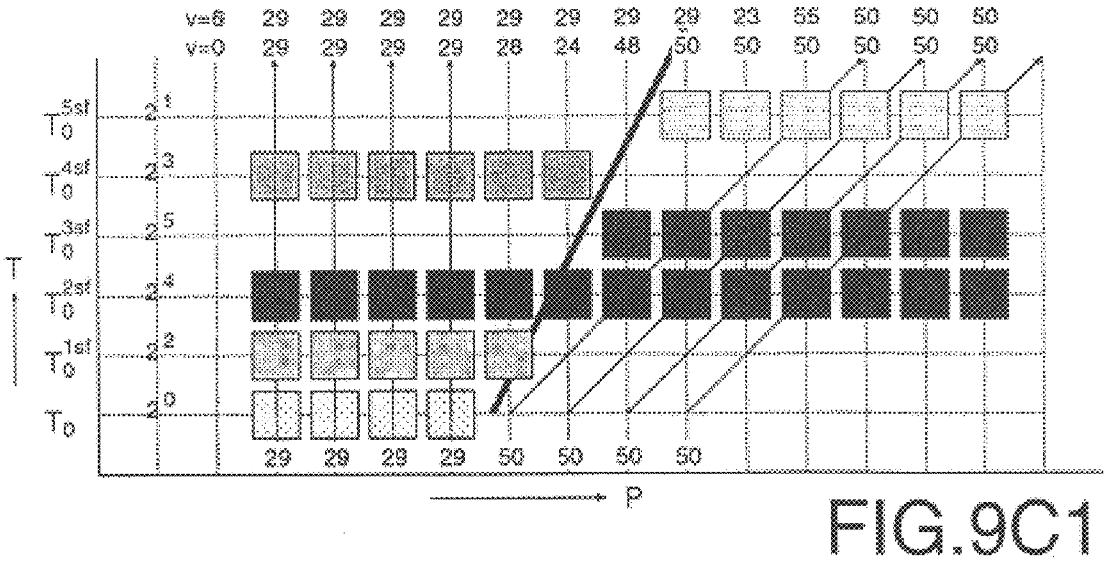
FIG.9C1

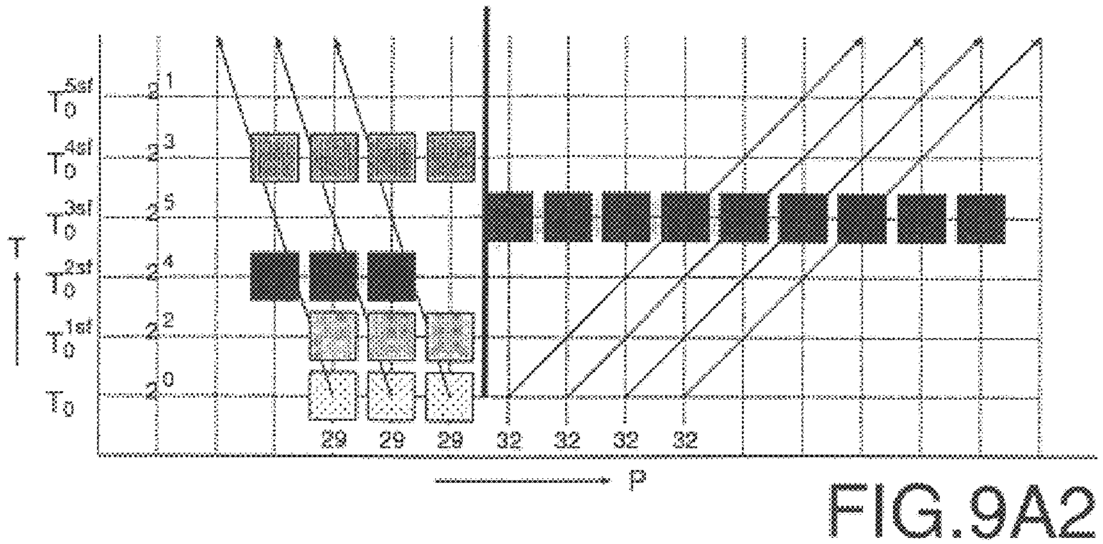
FIG.9A2
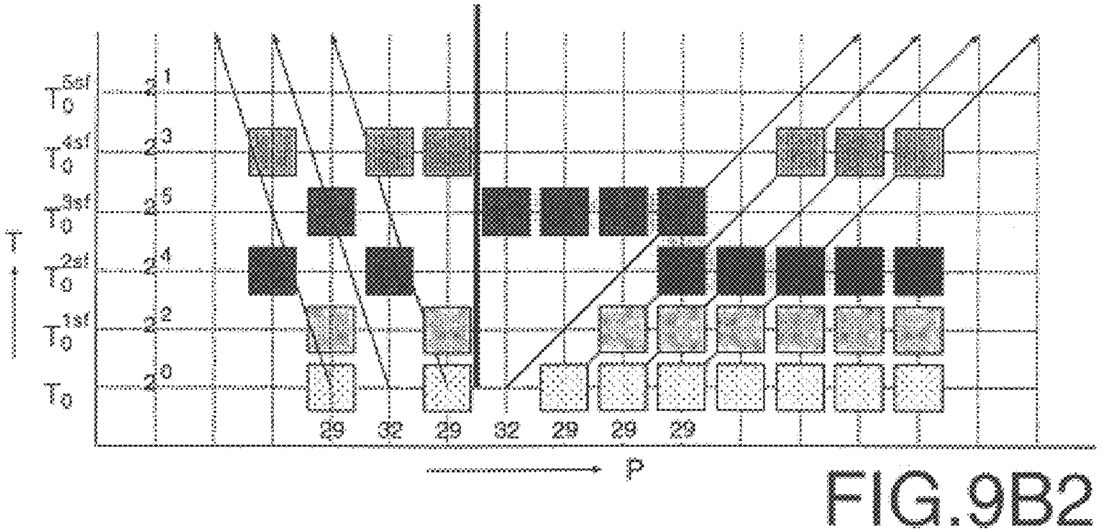
FIG.9B2
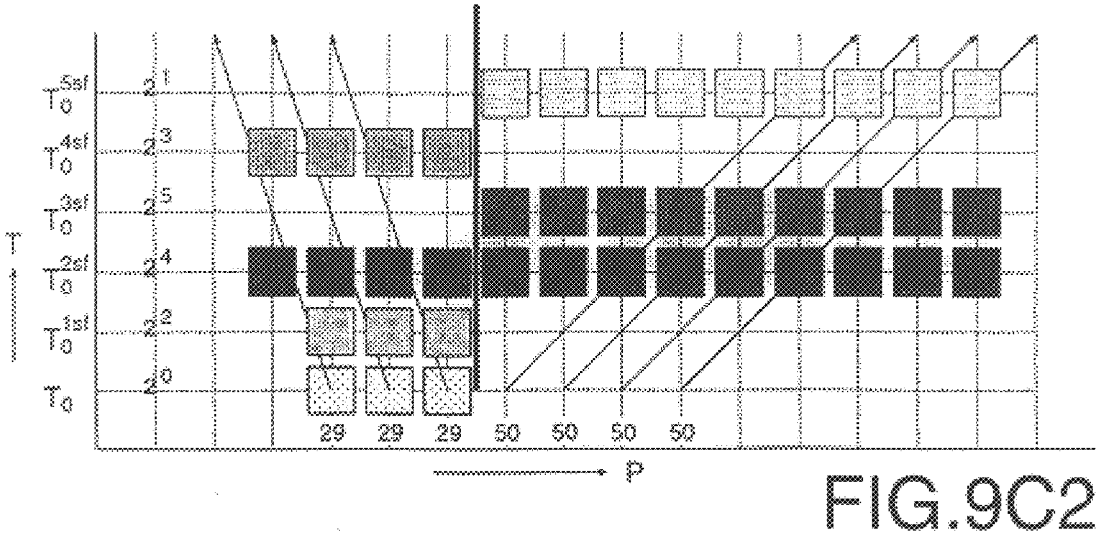
FIG.9C2

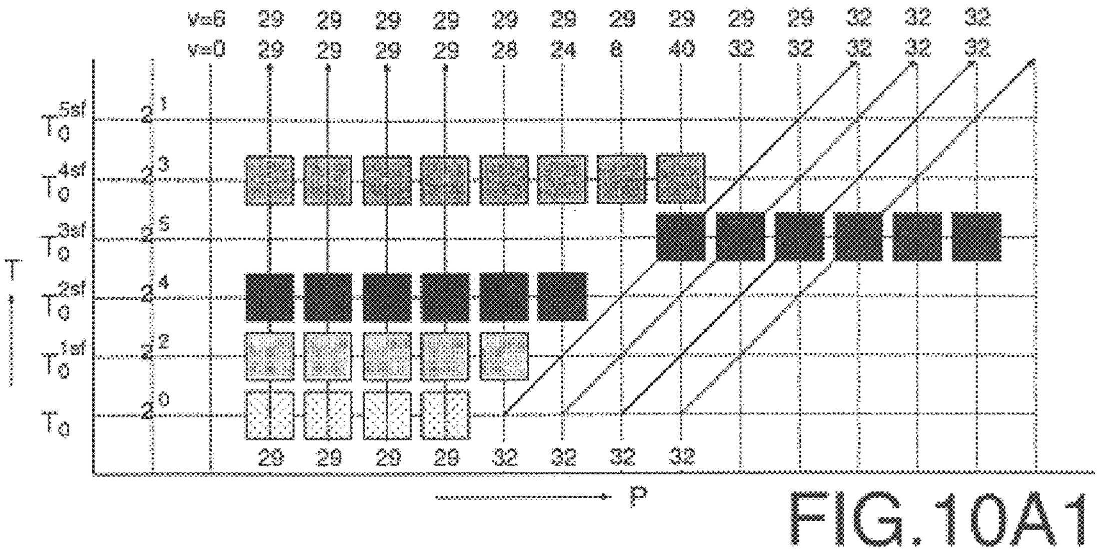
FIG.10A1
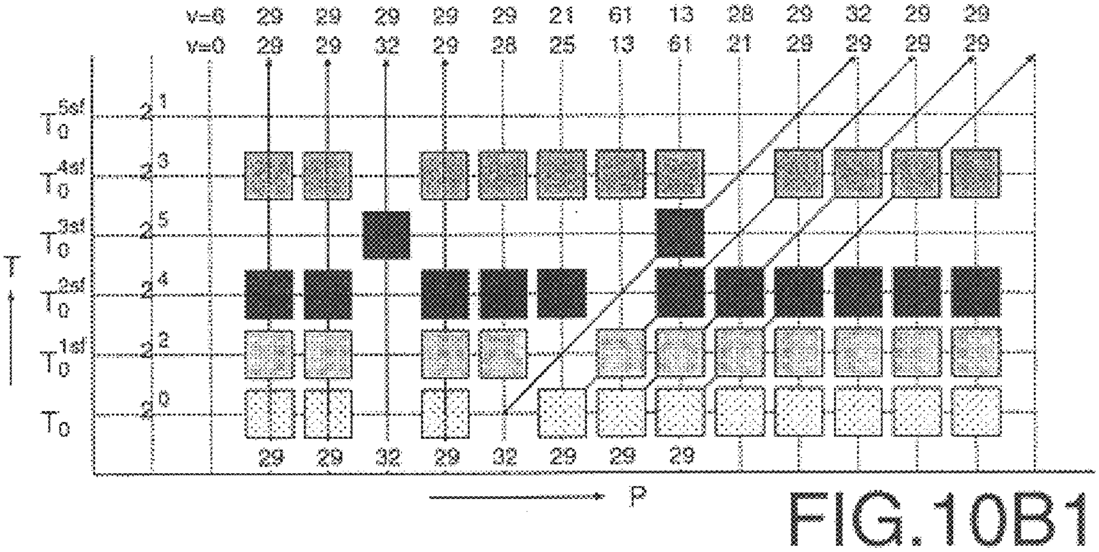
FIG.10B1
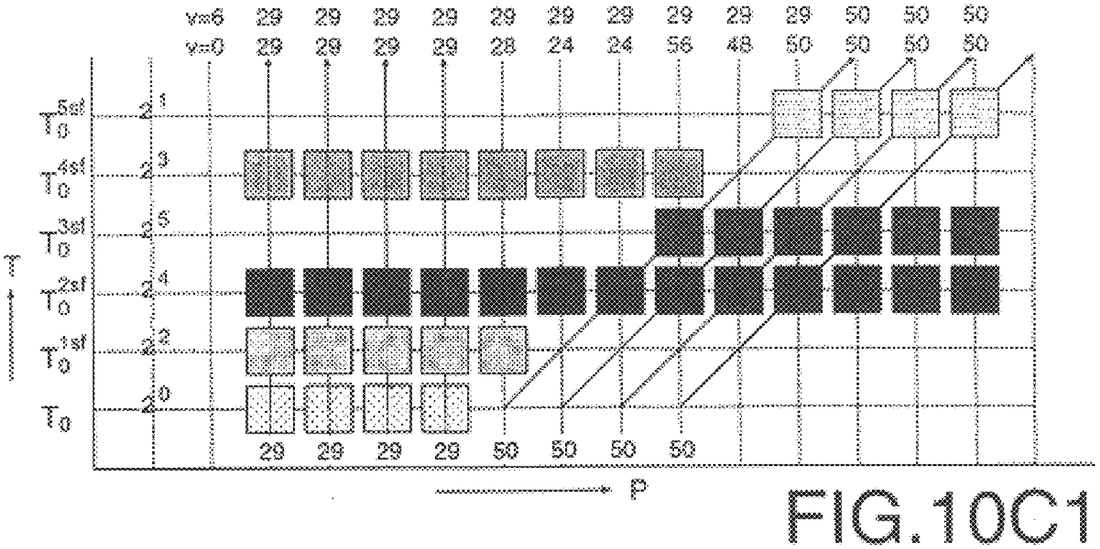
FIG.10C1

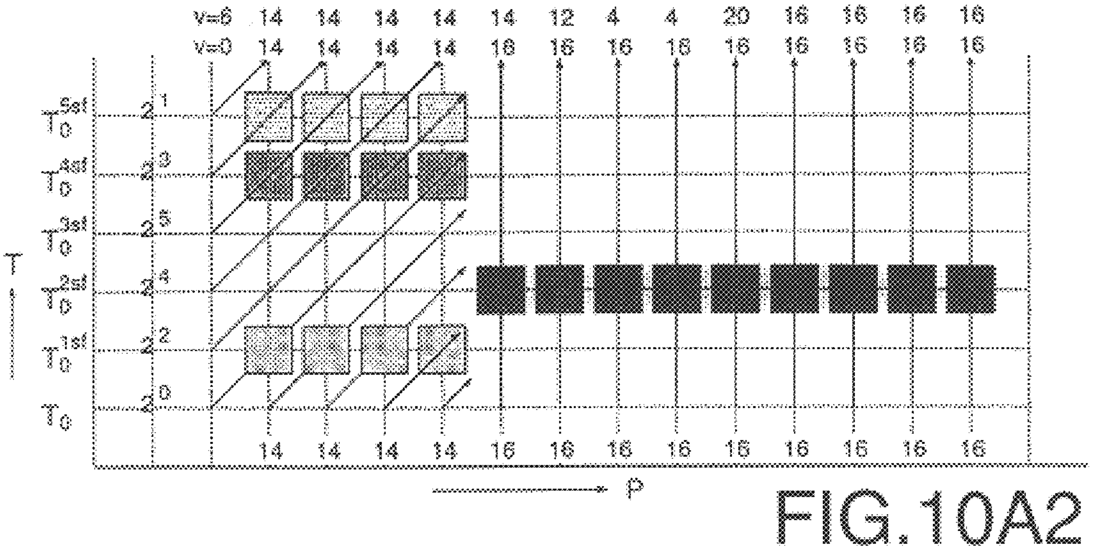
FIG.10A2
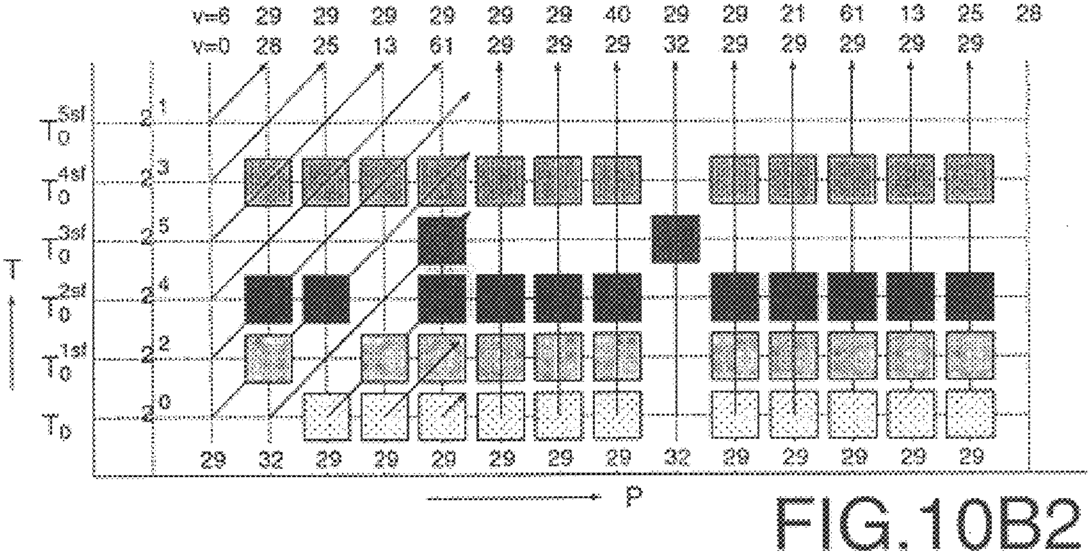
FIG.10B2
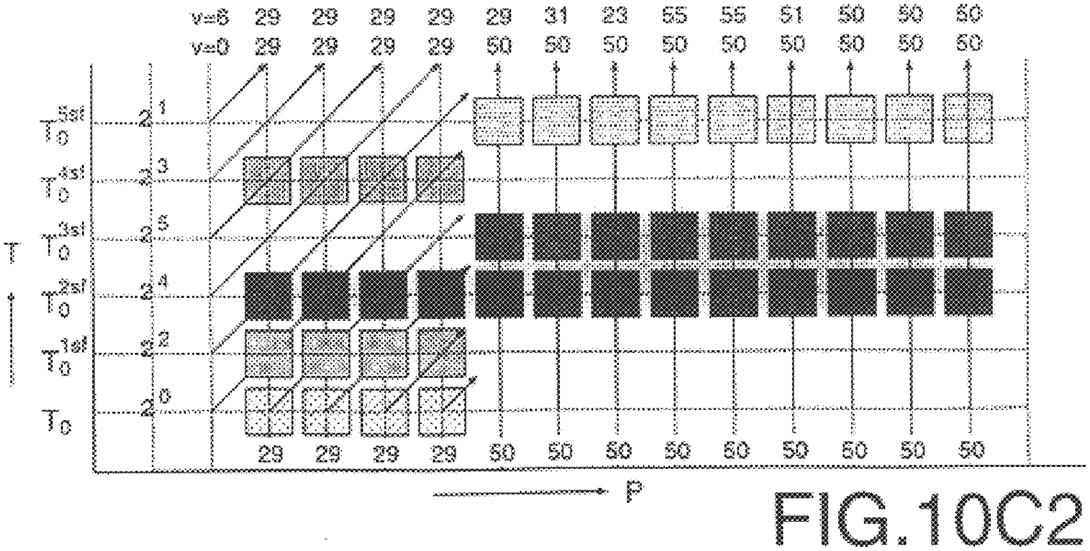
FIG.10C2

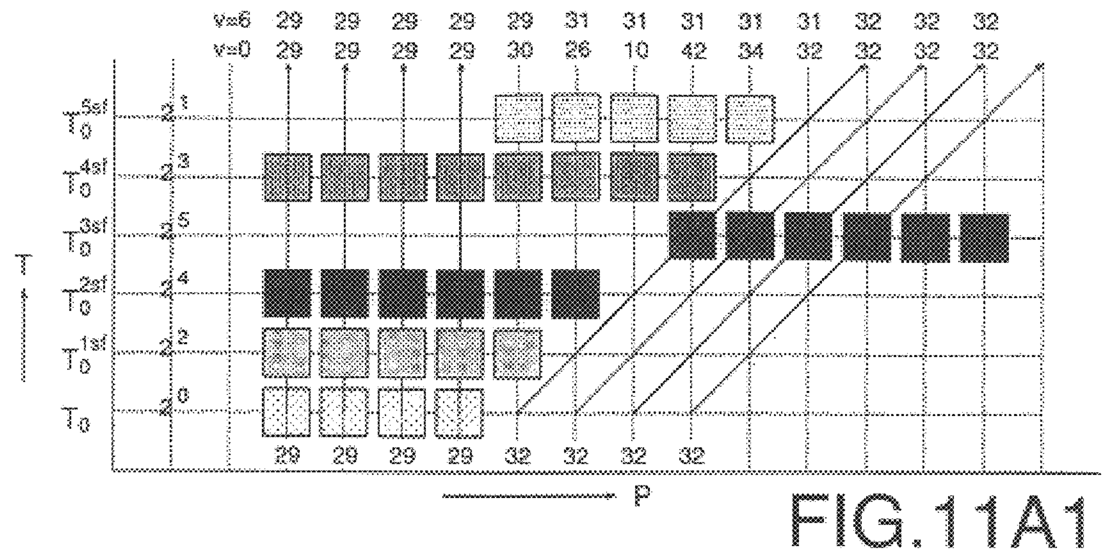
FIG.11A1
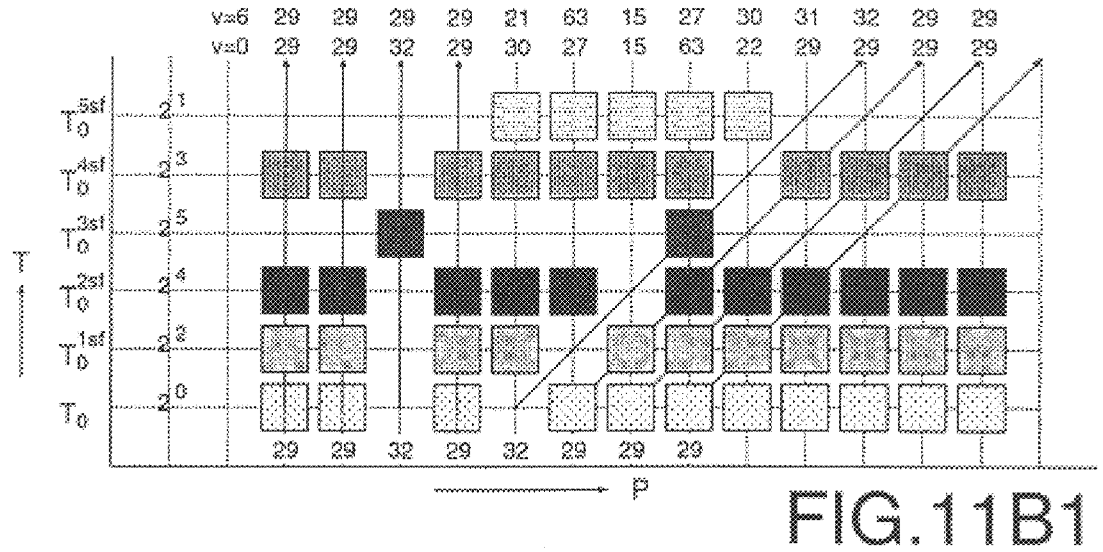
FIG.11B1
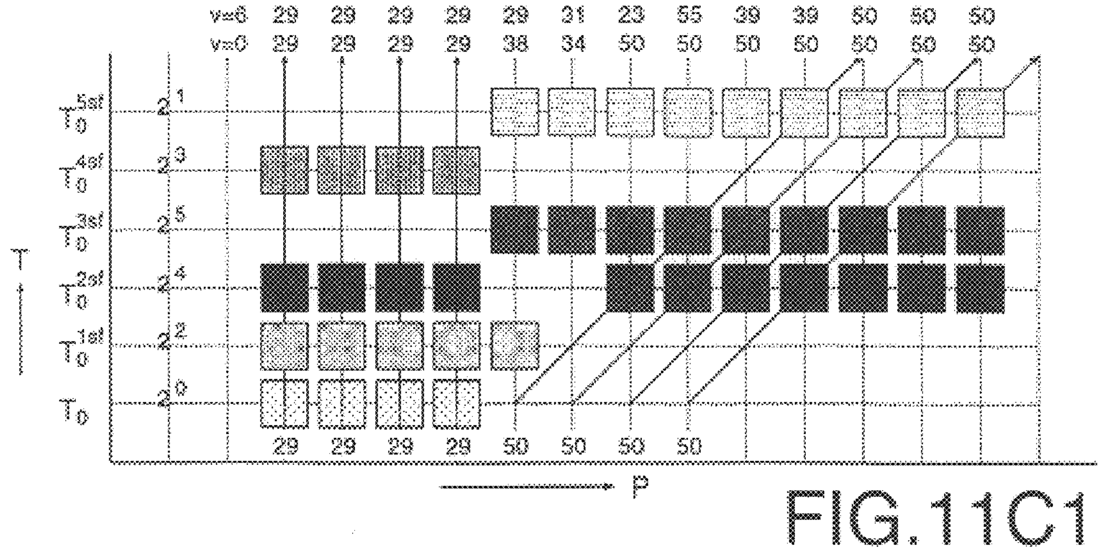
FIG.11C1

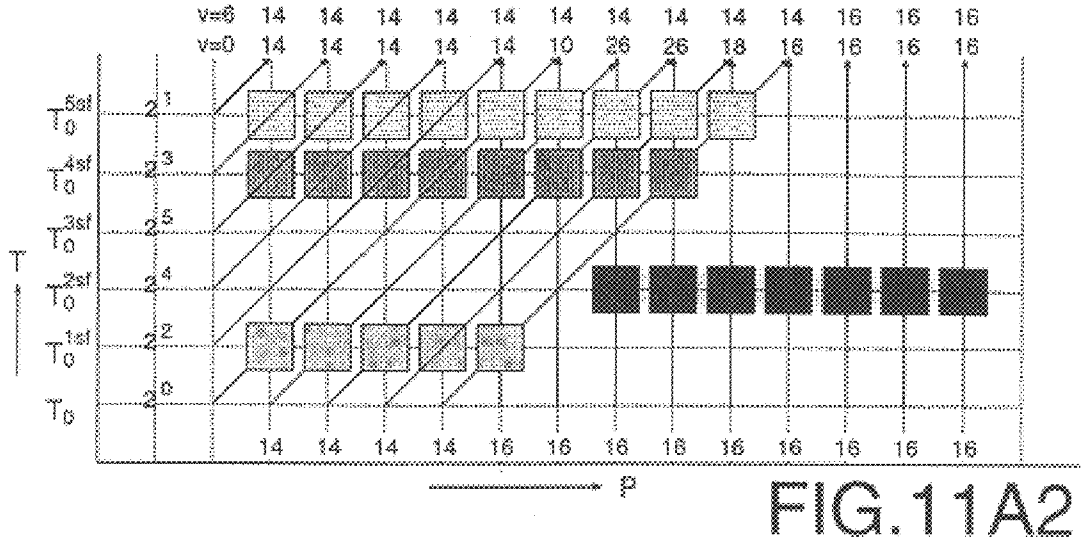
FIG.11A2
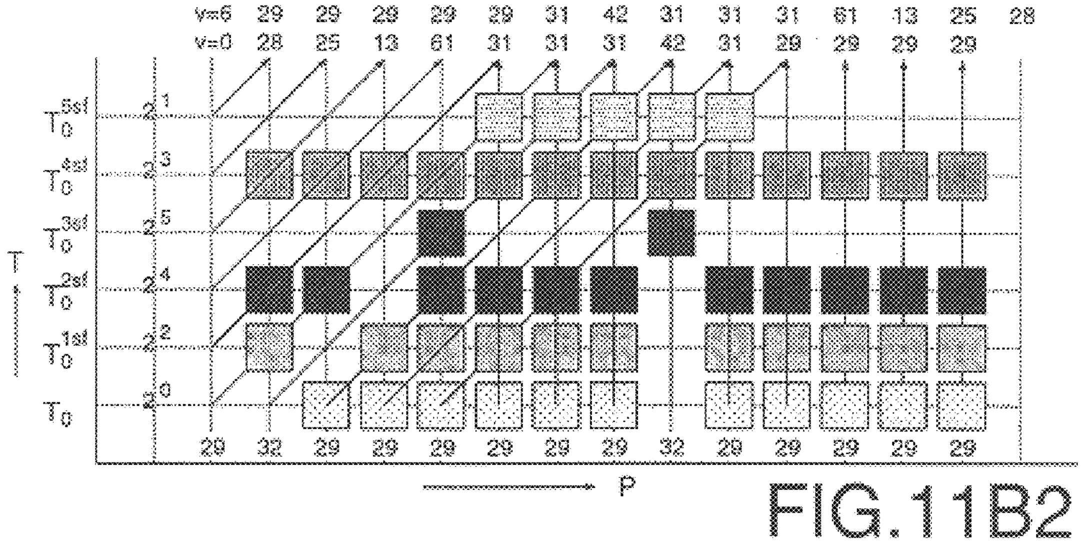
FIG.11B2
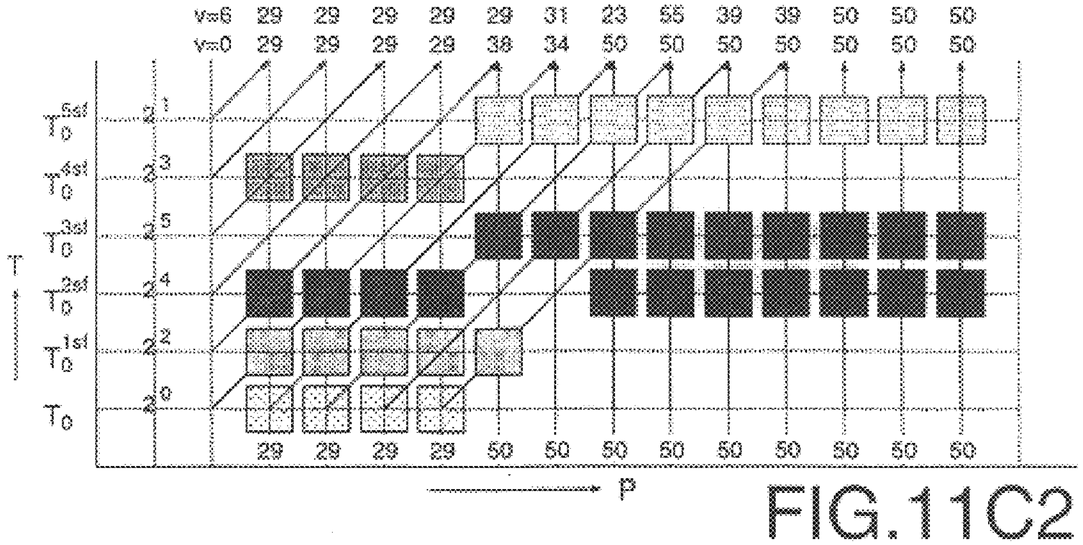
FIG.11C2

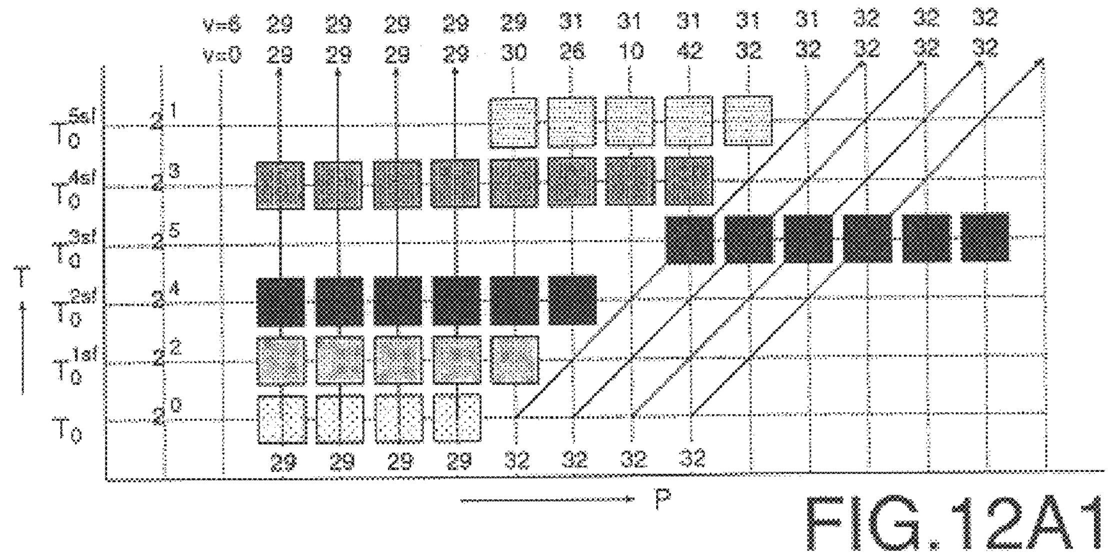
FIG.12A1
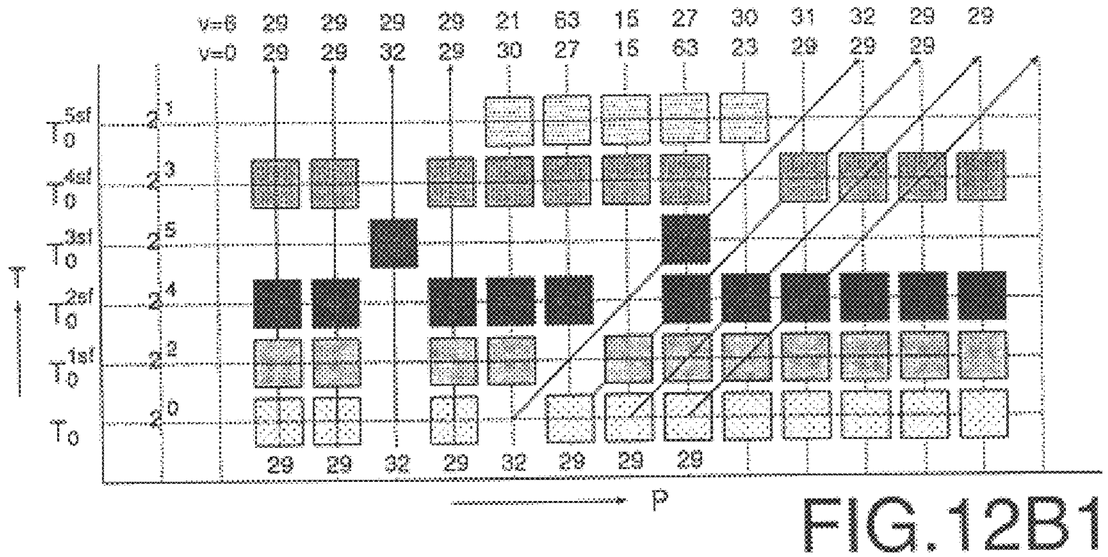
FIG.12B1
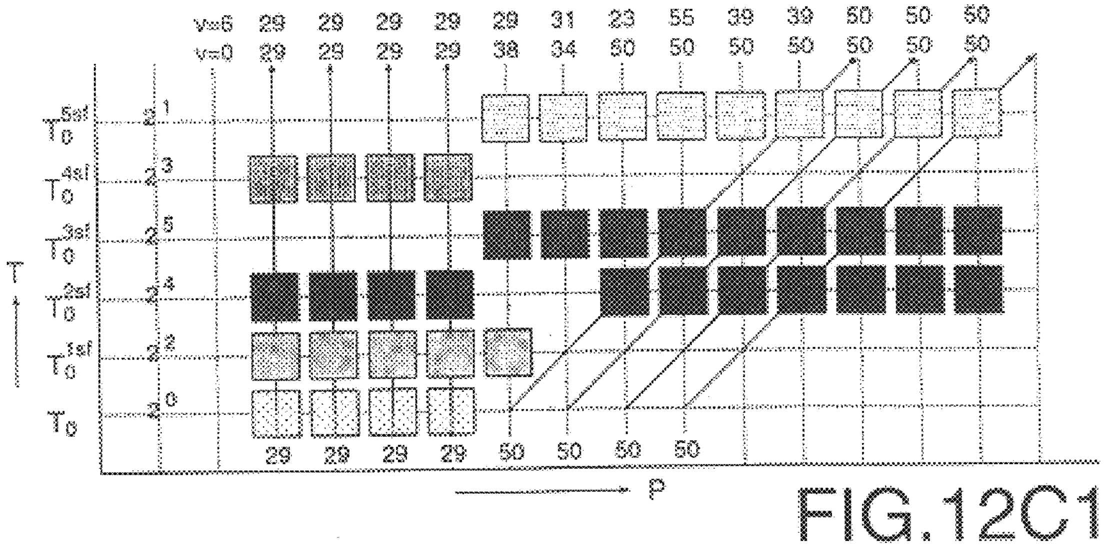
FIG.12C1

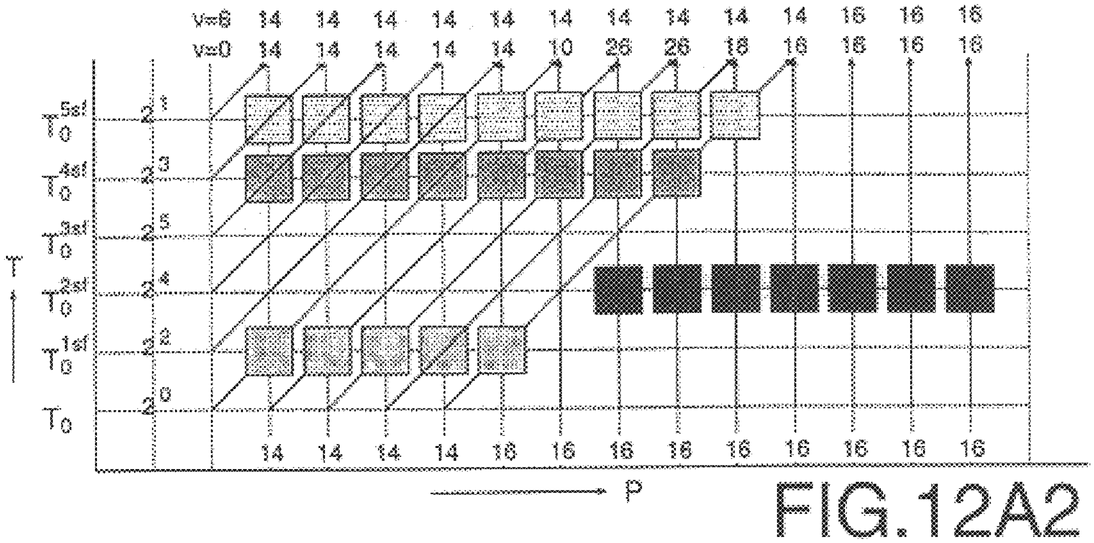
FIG.12A2
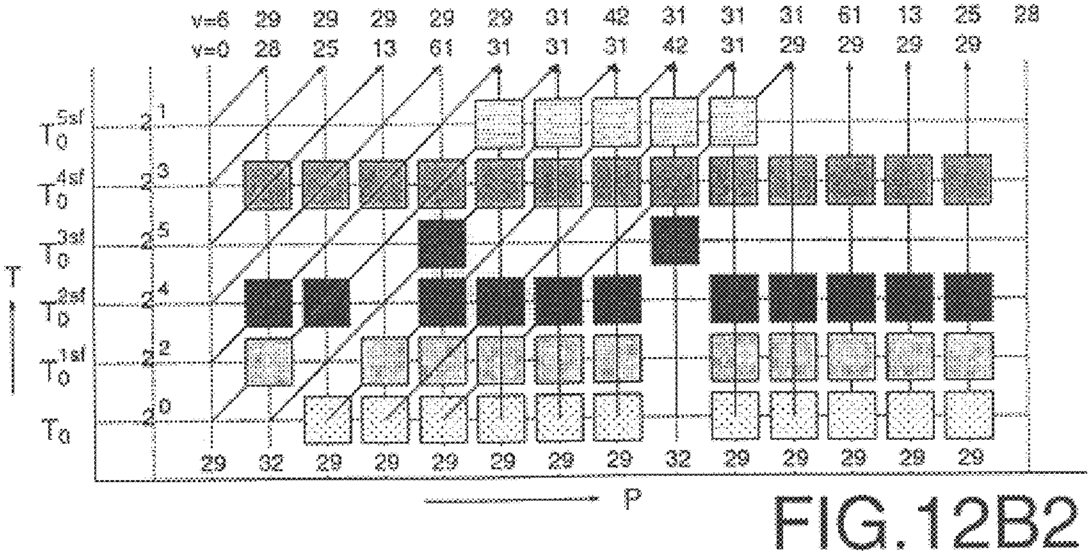
FIG.12B2
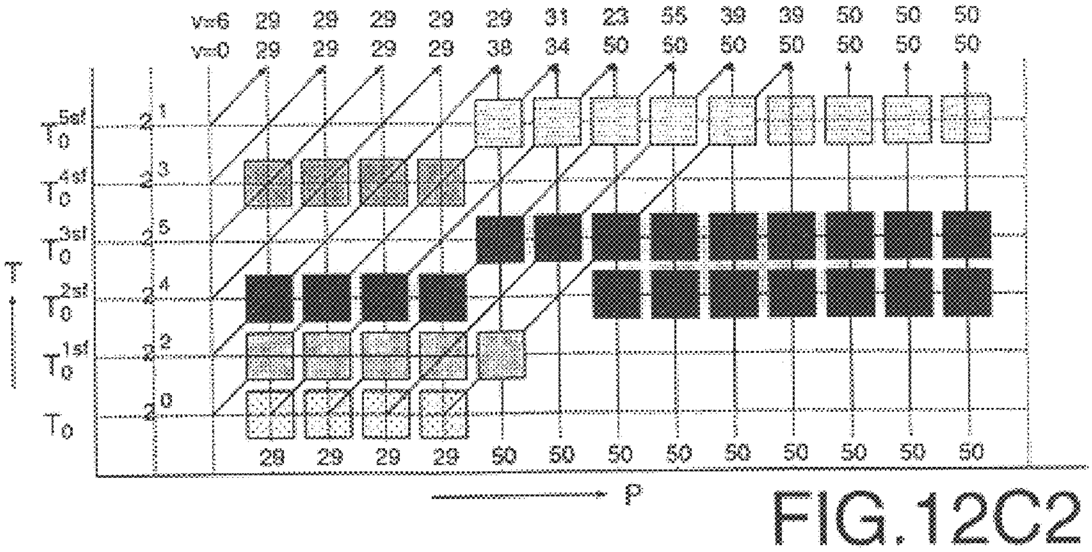
FIG.12C2

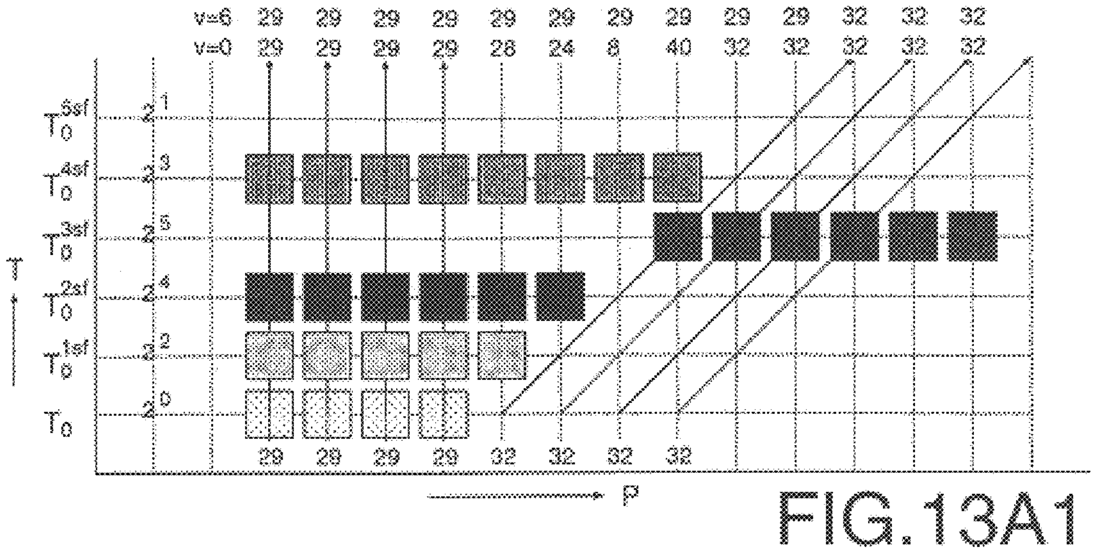
FIG.13A1
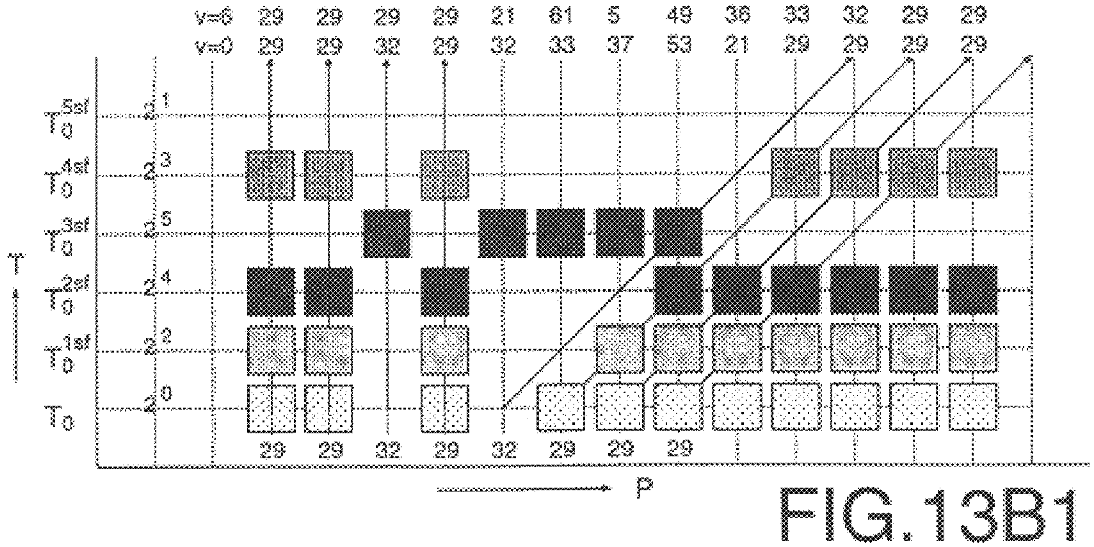
FIG.13B1
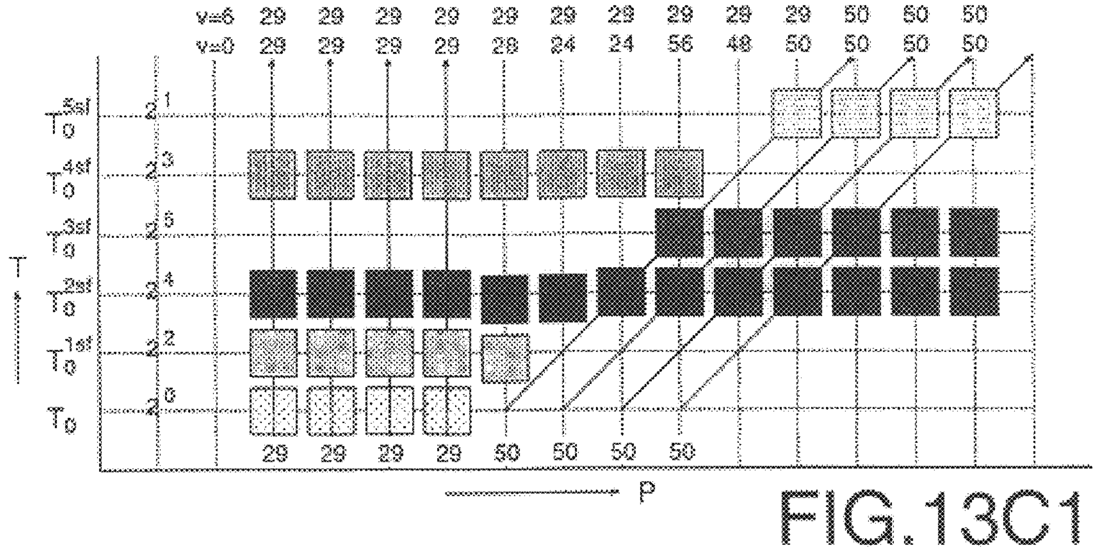
FIG.13C1

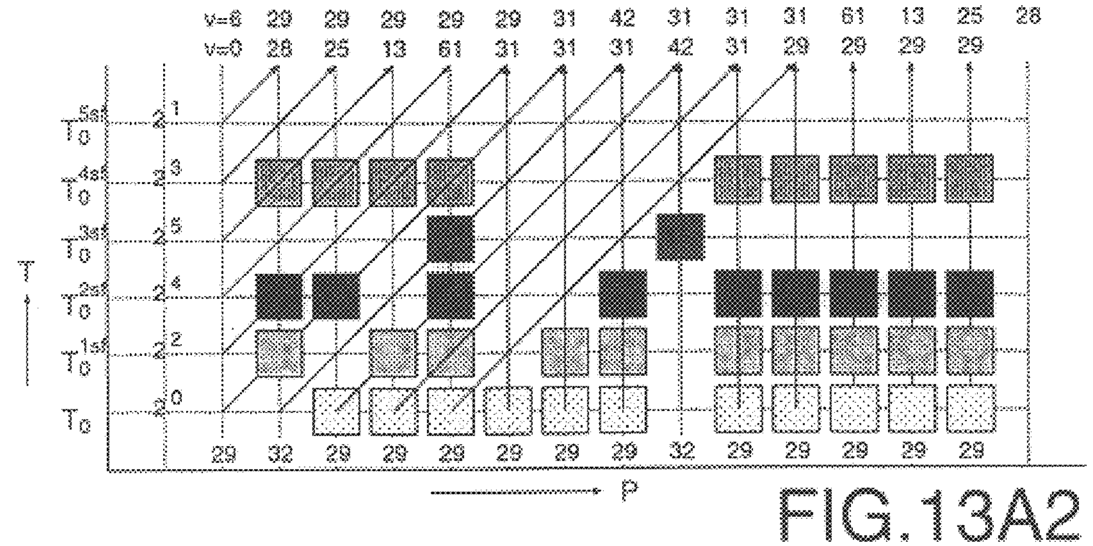
FIG.13A2
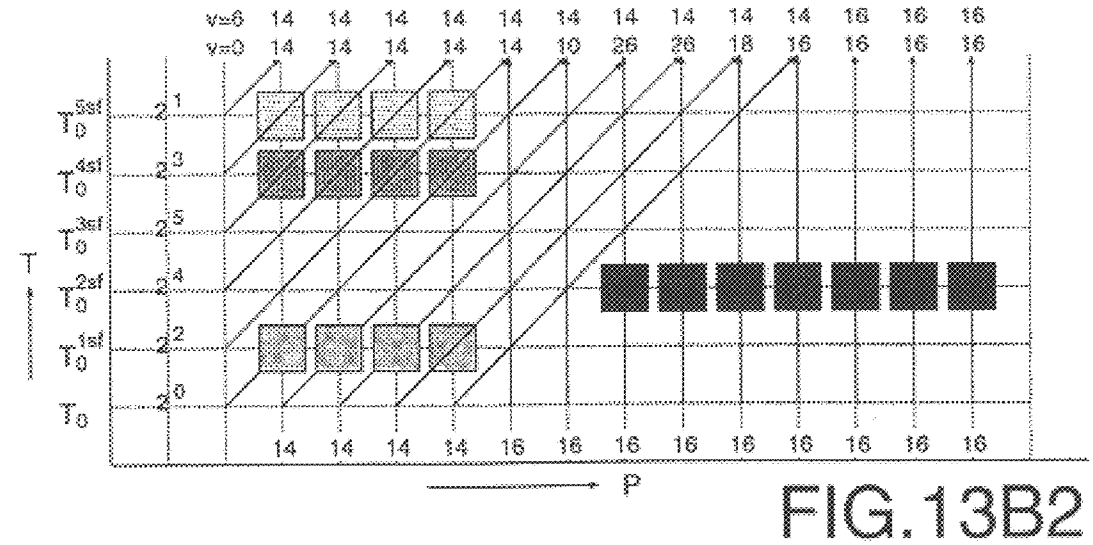
FIG.13B2
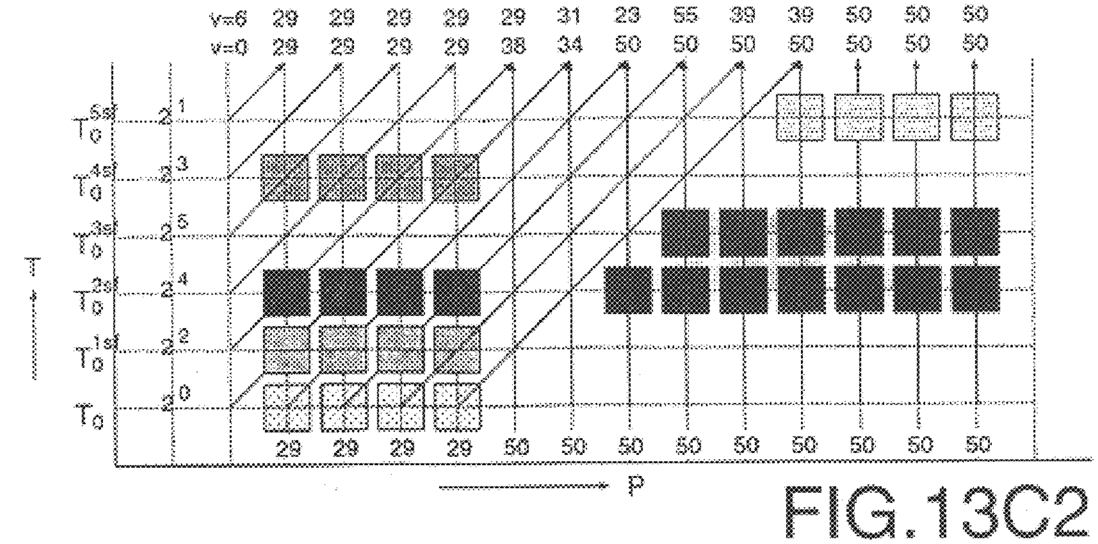
FIG.13C2

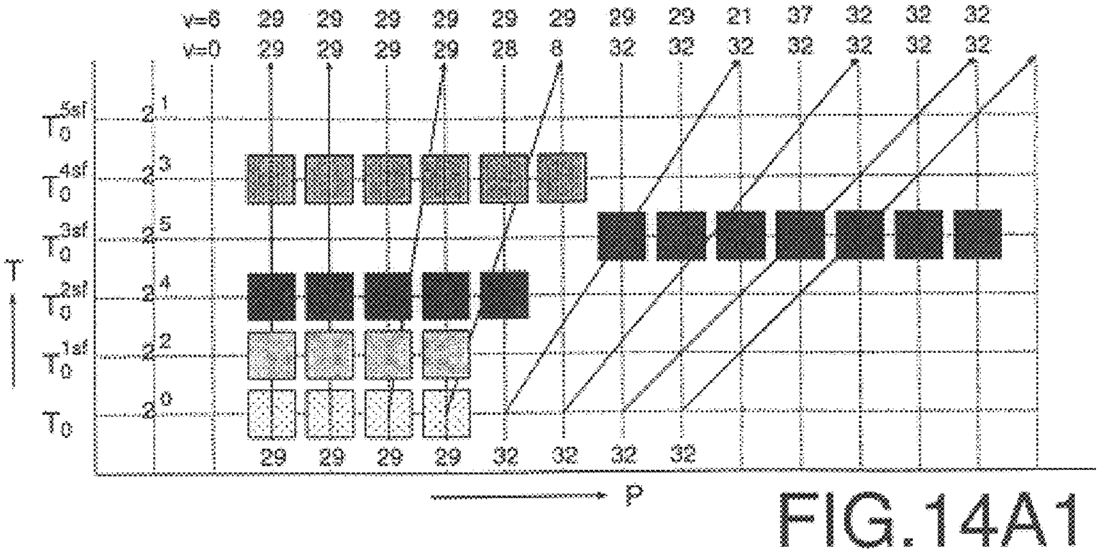
FIG.14A1
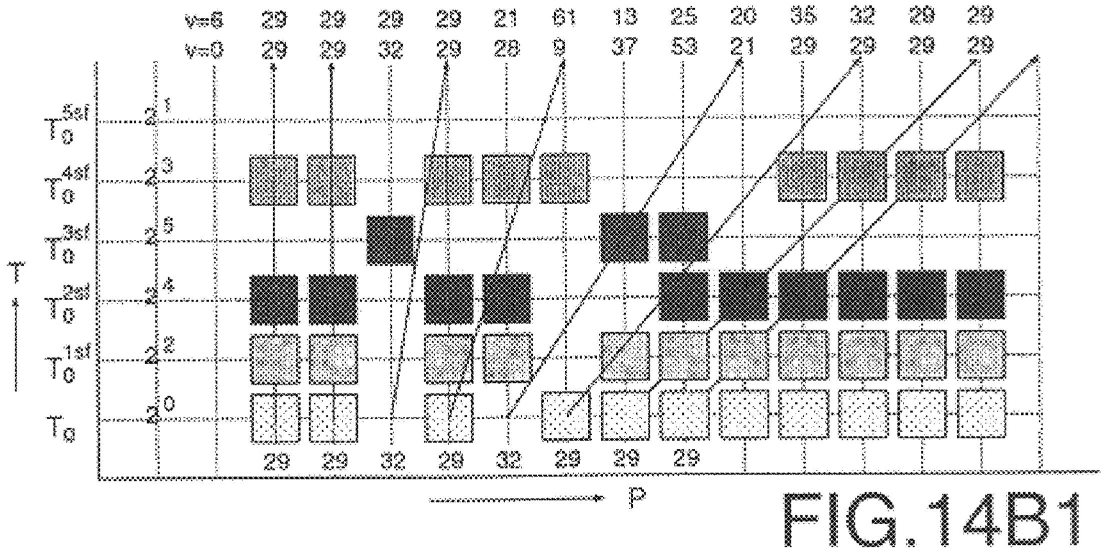
FIG.14B1
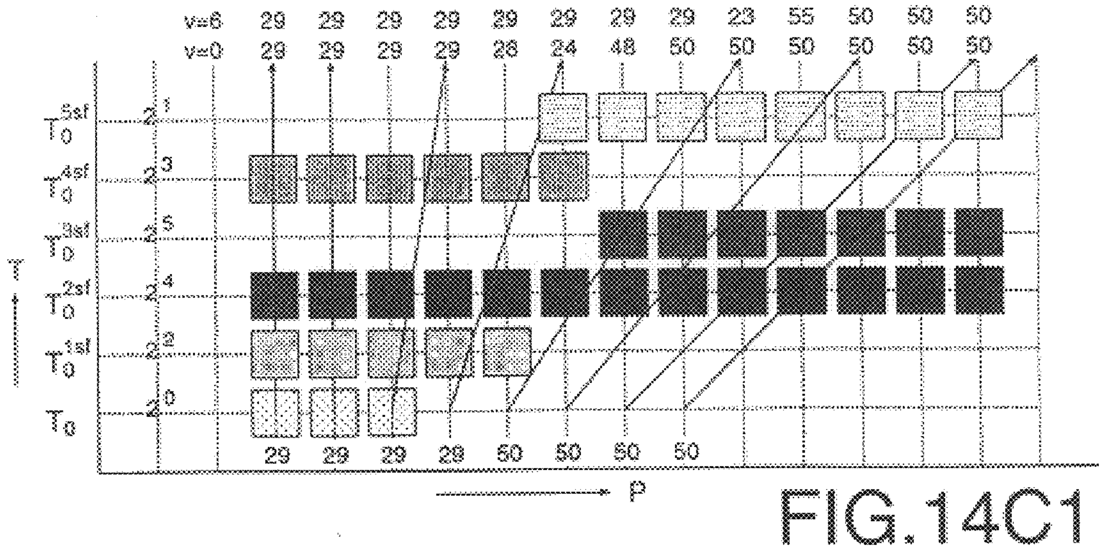
FIG.14C1

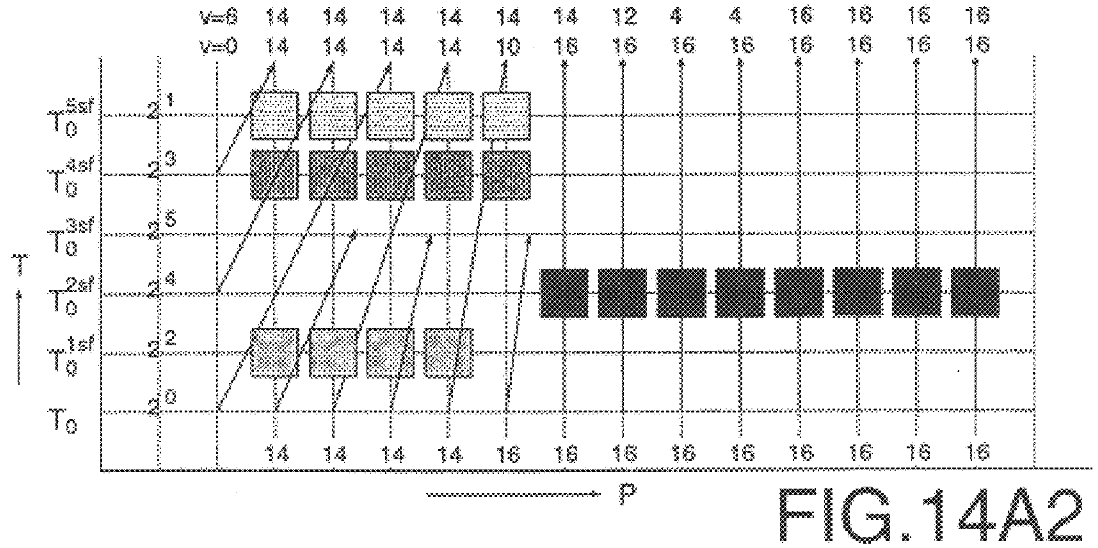
FIG.14A2
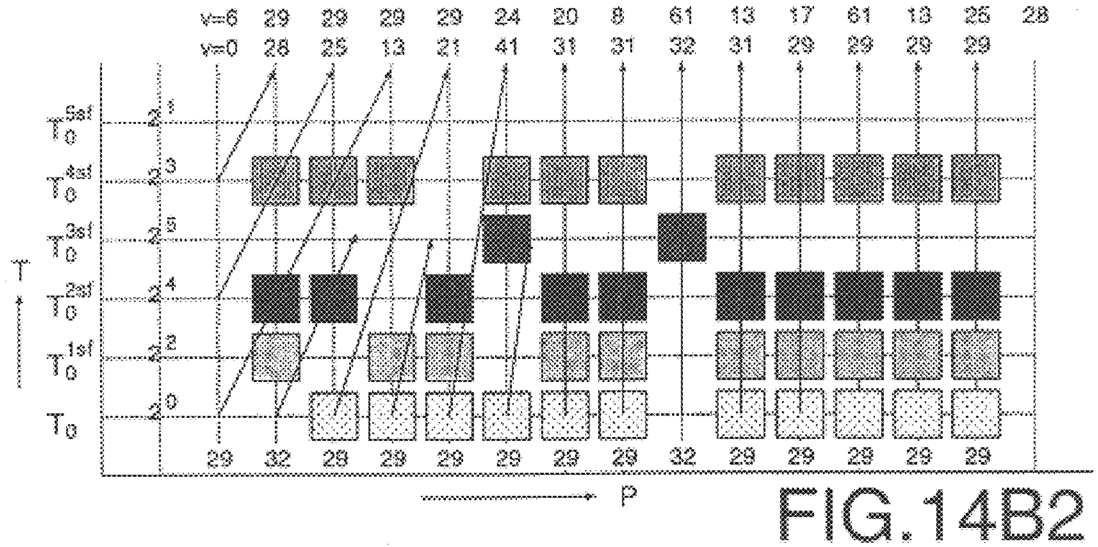
FIG.14B2
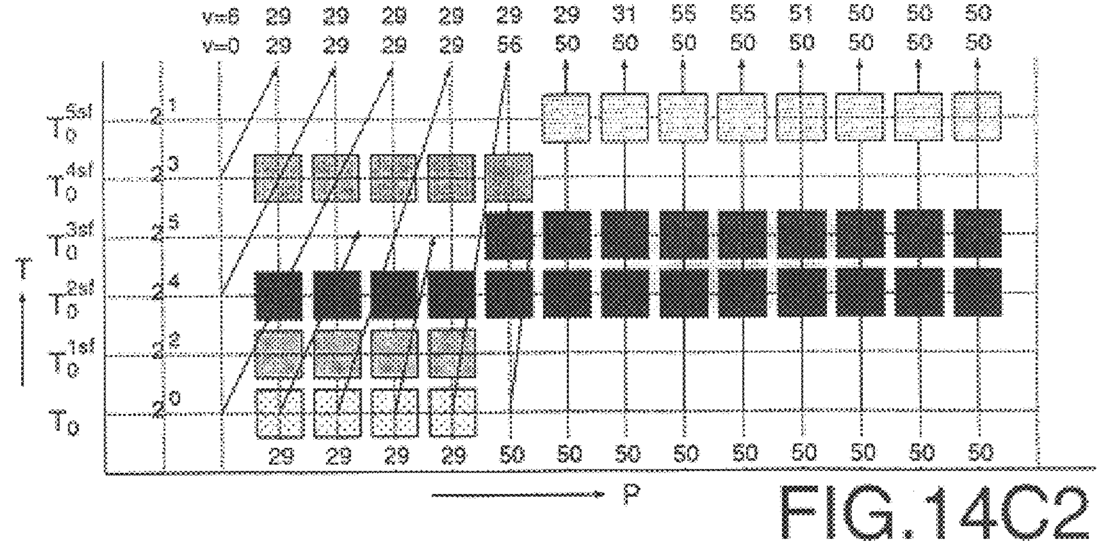
FIG.14C2

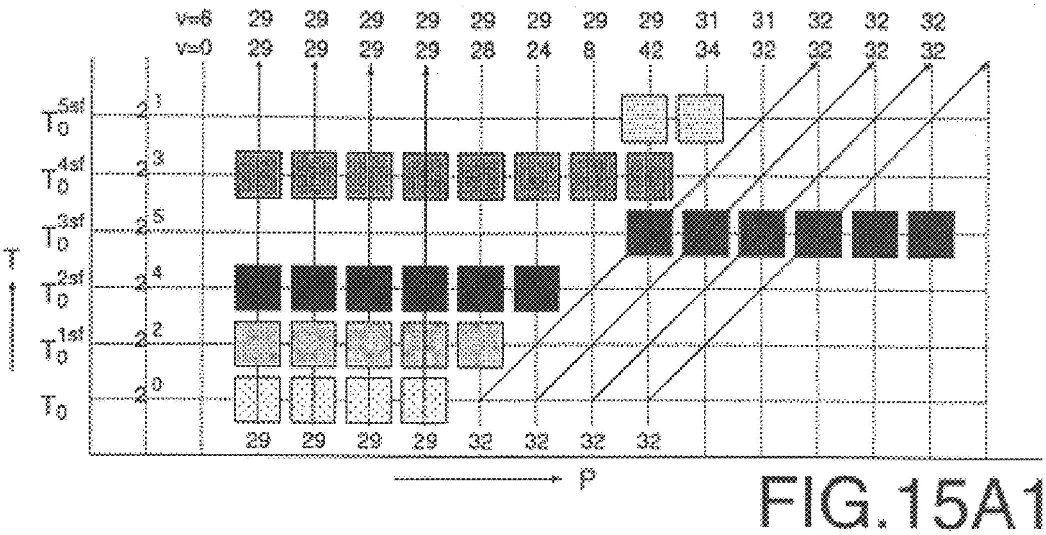
FIG.15A1
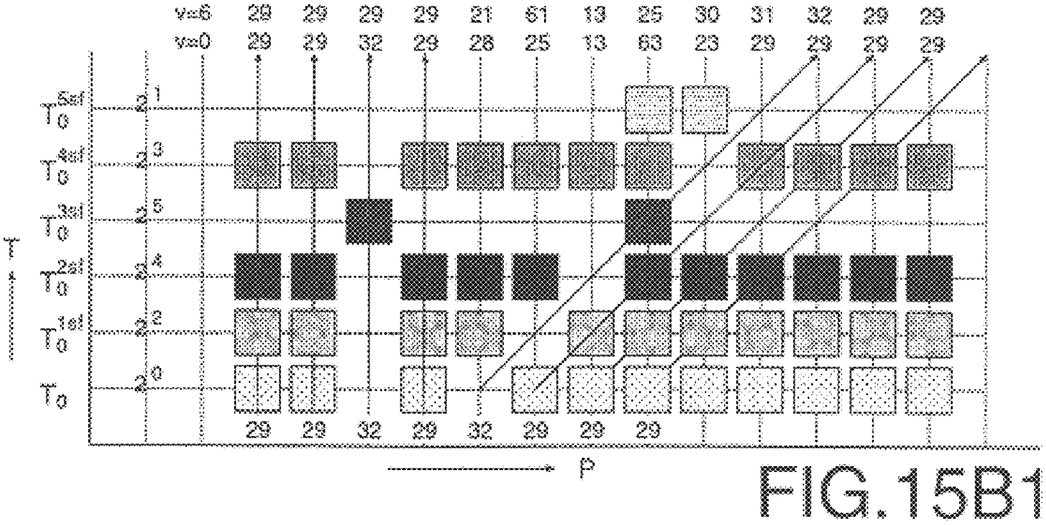
FIG.15B1
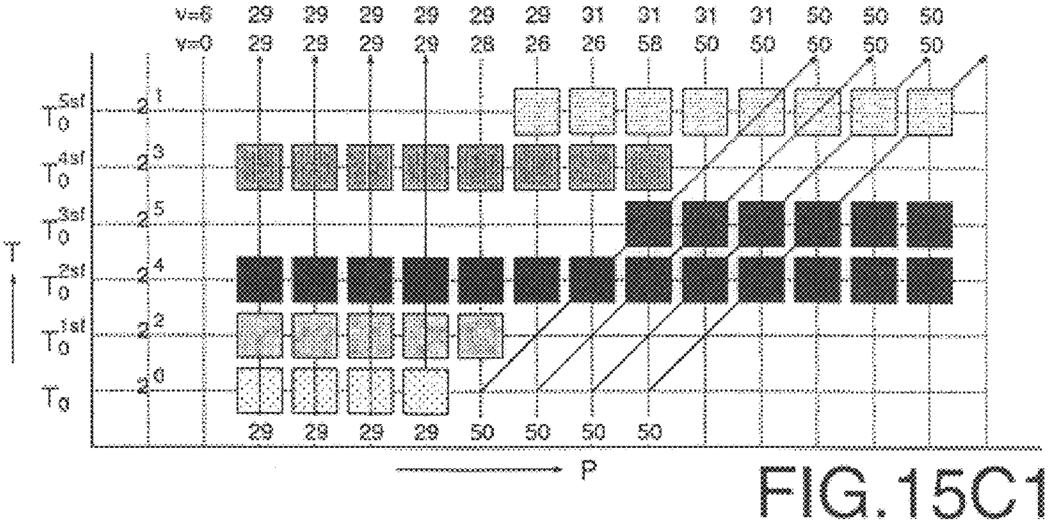
FIG.15C1

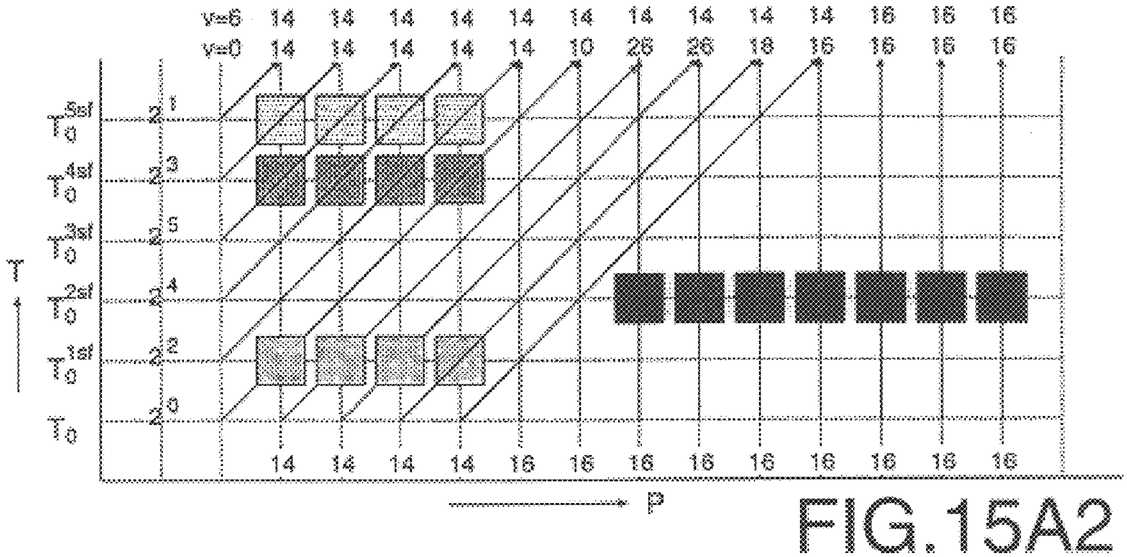
FIG.15A2
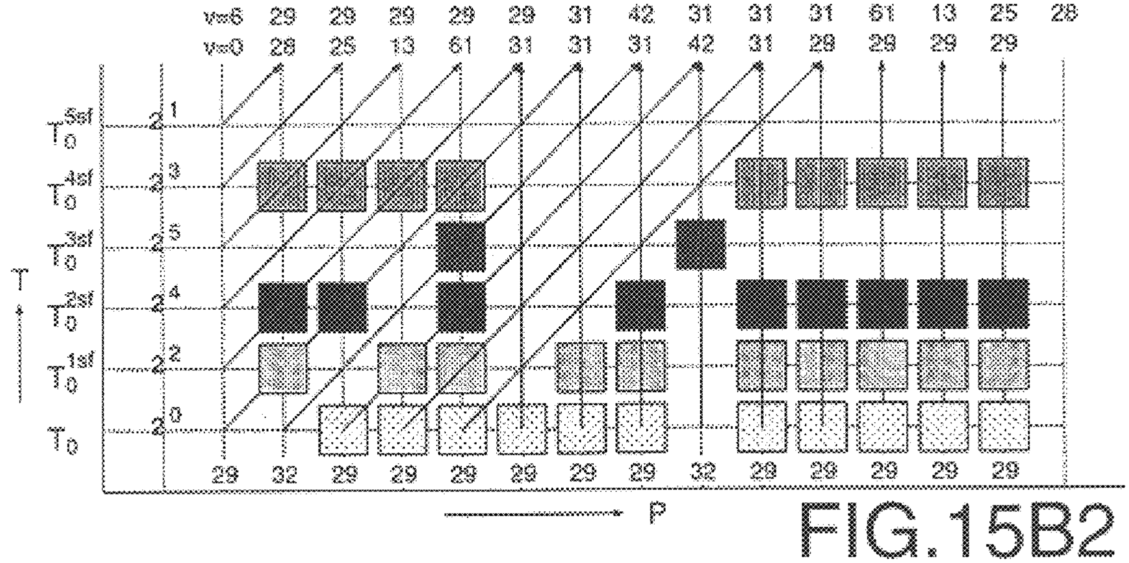
FIG.15B2
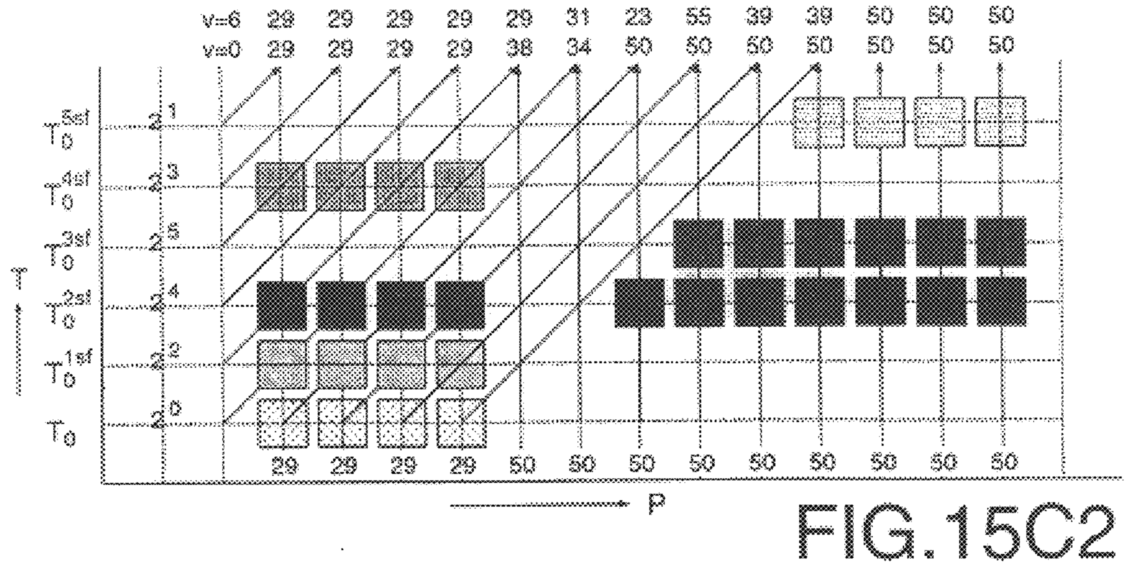
FIG.15C2

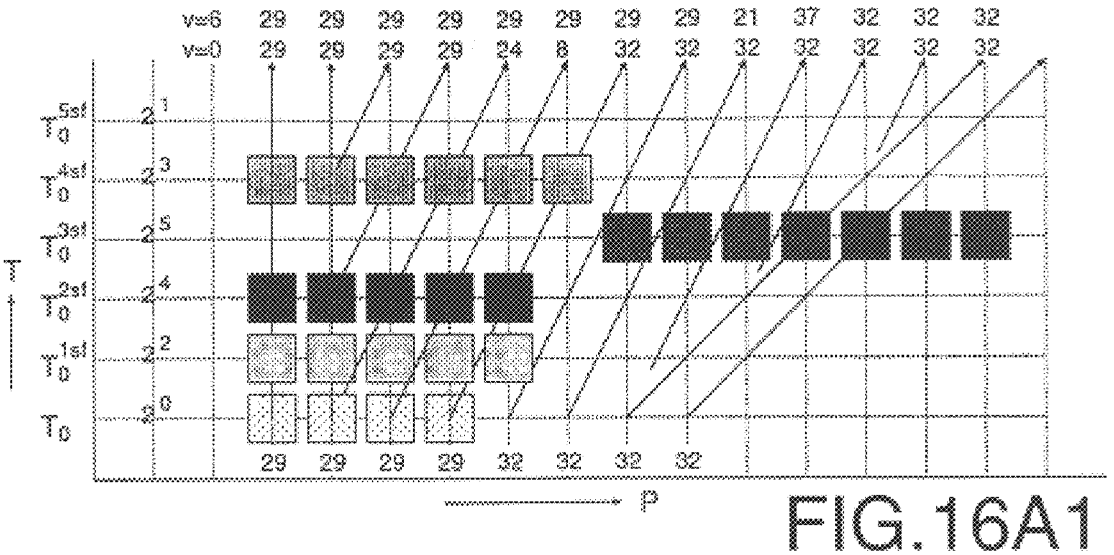
FIG.16A1
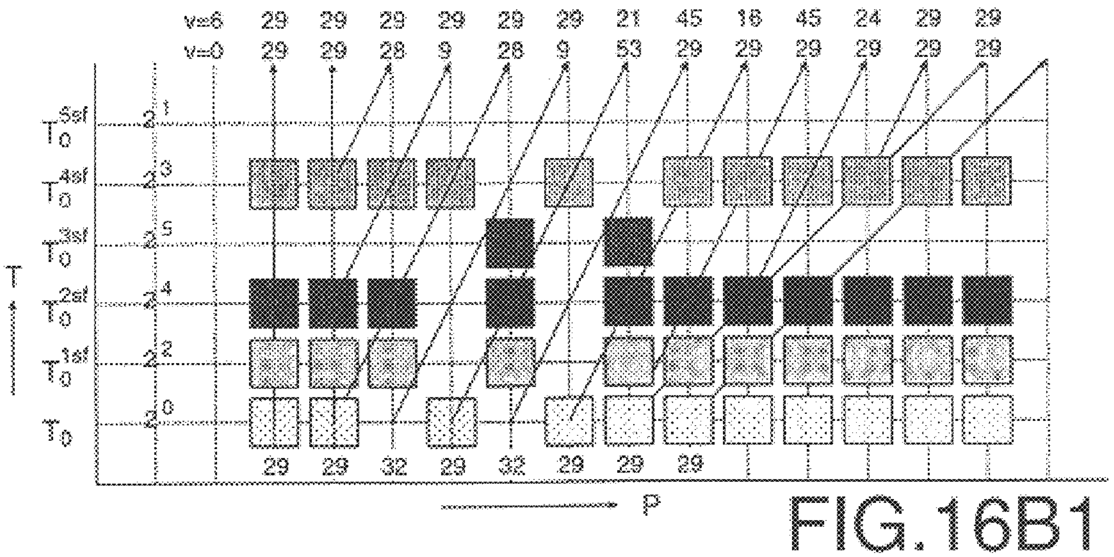
FIG.16B1
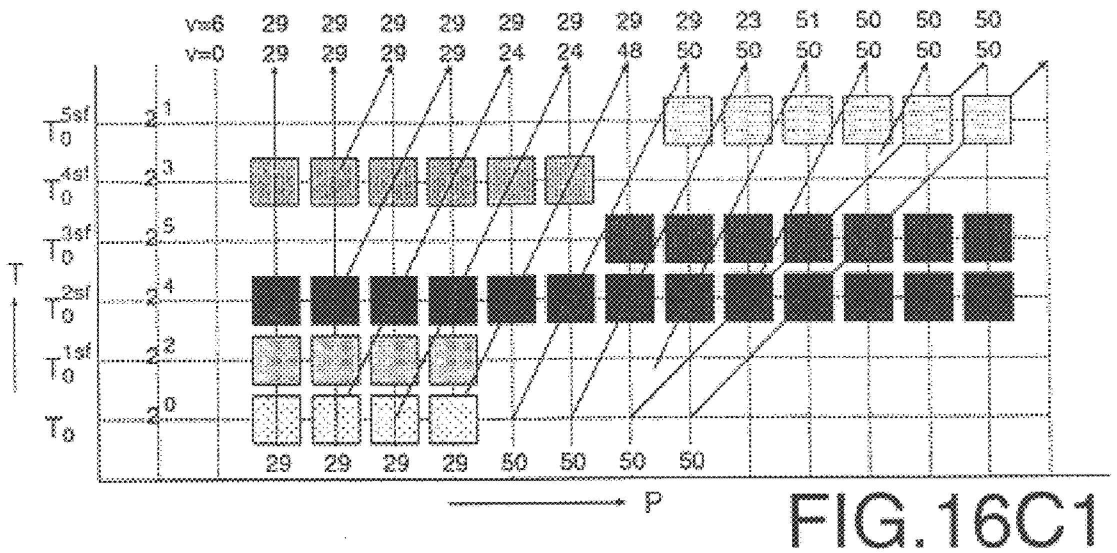
FIG.16C1

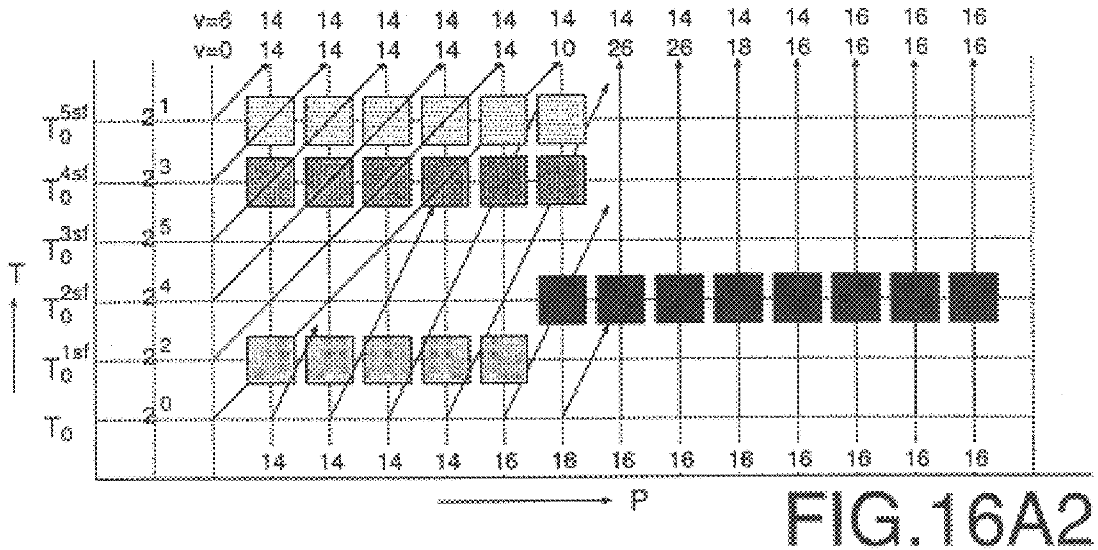
FIG.16A2
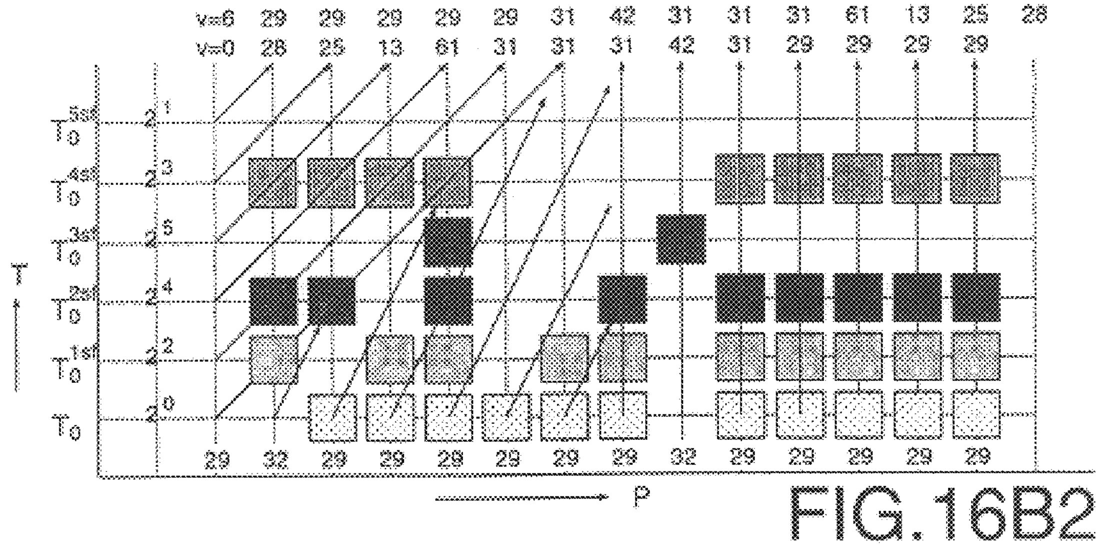
FIG.16B2
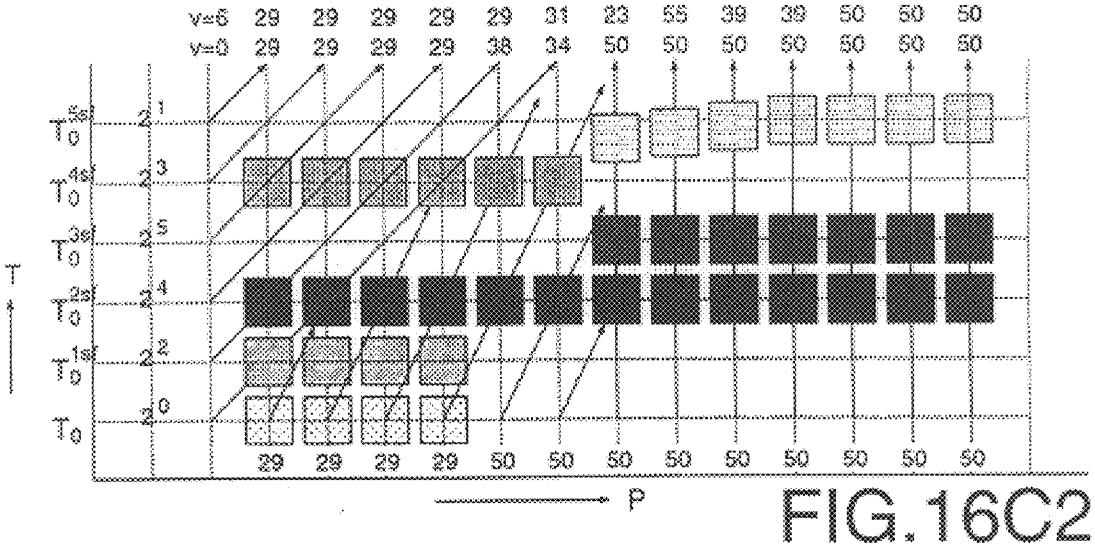
FIG.16C2

SUBFIELD-DRIVEN DISPLAY

BACKGROUND OF THE INVENTION

1. Field of the Invention

The invention relates to a method of driving a subfield-driven display, and to a subfield-driven display apparatus.

2. Description of the Related Art

In plasma display panels (PDPs) or other subfield-based display devices, motion artifacts are present due to the way gray-scales are made. Furthermore, motion compensation is applied in PDPs to reduce motion artifacts. The artifacts are caused by the way our eyes perceive motion by tracking a moving object. This results in the situation that more pixels at various moments are combined in the gray-scale that is observed during motion tracking. Due to the way, gray-levels are made on a PDP (and DMD), various subfields of various pixels contribute to the gray-level that is being observed. This can results in "dynamic false contours", i.e. small changes in luminance (an object that is moving with a gradual changing gray-level or color) can result in large changes in luminances. Motion compensation can be used to reduce this error. In natural sequences objects are moving in various directions with various speeds. Due to the way motion compensation is implemented, a problem arises on the border of the speed variations, i.e. the areas of covering and uncovering. Therefore, some measures must be taken to prevent artifacts at these borders.

SUMMARY OF THE INVENTION

It is, inter alia, an object of the invention to provide a motion compensation having reduced covering and uncovering artifacts. To this end, the invention provides a method of driving a subfield-driven display and a subfield-driven display apparatus.

In a method of driving a subfield-driven display (PDP) in accordance with a primary aspect of the present invention, for a position in a subfield it is examined whether a motion vector for the position differs from a motion vector for a neighboring position to determine whether uncovering or covering is present. If uncovering or covering is present, a size of an area of covering and uncovering is calculated, and the area of covering and uncovering is filled in.

Preferably, the solutions are intra-field methods to overcome the covering/uncovering artifacts as intra-field methods are easier to implement (no field memories are required).

These and other aspects of the invention will be apparent from and elucidated with reference to the embodiments described hereinafter.

BRIEF DESCRIPTION OF THE DRAWINGS

In the drawings:

FIGS. 3A–3C, 4A–4B, and 5A 1/2–5C 1/2 illustrate the problem to be solved due to a spatial change of the motion vectors;

FIGS. 6A 1/2–6C 1/2 show a solution in which the uncovered area (1) or covered area (2) is filled in with luminances from left to right;

FIGS. 7A 1/2–7C1/2 show a solution in which the uncovered area (1) or covered area (2) is filled in with luminances from right to left;

FIGS. 8A 1/2–8C 1/2 show a solution in which the uncovered area (1) or covered area (2) is filled in with luminances from left and right;

And FIGS. 9A 1/2–9C 1/2 show a solution in which the uncovered area (1) or covered area (2) is filled in with luminances from both sides;

FIGS. 10A 1/2–10C 1/2 show a solution in which the uncovered area (1) or covered area (2) is filled in with luminances from the direction of the lowest (or highest) speed;

FIGS. 11A 1/2–11C 1/2 show a solution in which the uncovered area (1) or covered area (2) is filled in with luminances from the average pixel value;

FIGS. 12A 1/2–12C 1/2 show a solution in which the uncovered area (1) or covered area (2) is filled in with the average of the luminances of the subfields of left and right;

FIGS. 13A 1/2–13C 1/2 illustrate median filtering on a subfield basis (uncovered 1, covered 2);

FIGS. 14A 1/2–14C 1/2 illustrate a slowly changing speed (uncovered 1, covered 2);

FIGS. 15A 1/2–15C 1/2 illustrate a slowly changing luminance (uncovered 1, covered 2);

FIGS. 16A 1/2–16C 1/2 illustrate transition areas with the average of the luminances from left and right (uncovered 1, covered 2);

DETAILED DESCRIPTION OF THE PRESENTLY PREFERRED EMBODIMENTS

Figure 1:
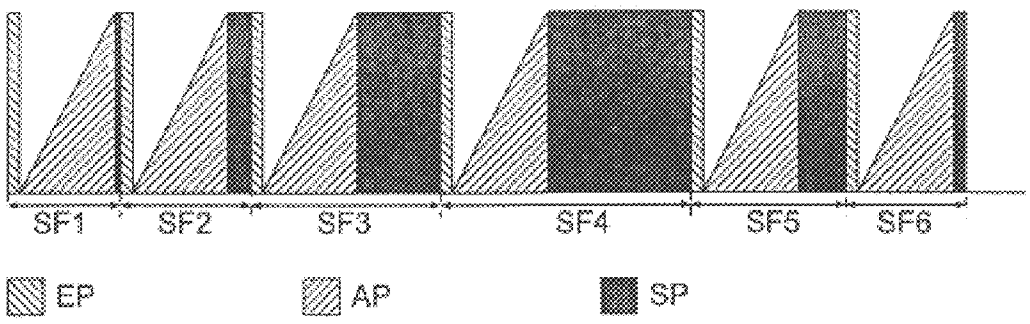
FIG. 1 shows a field period for a typical plasma display device.

In FIG. 1, six subfields SF1–SF6 are given for a PDP. By combining the subfields, a gray-scale can be made, in this case binary subfields are shown. The solutions here are not limited to binary subfield weights. EP indicates an erase period, AP an addressing period, and SP a sustain period.

Figure 2:
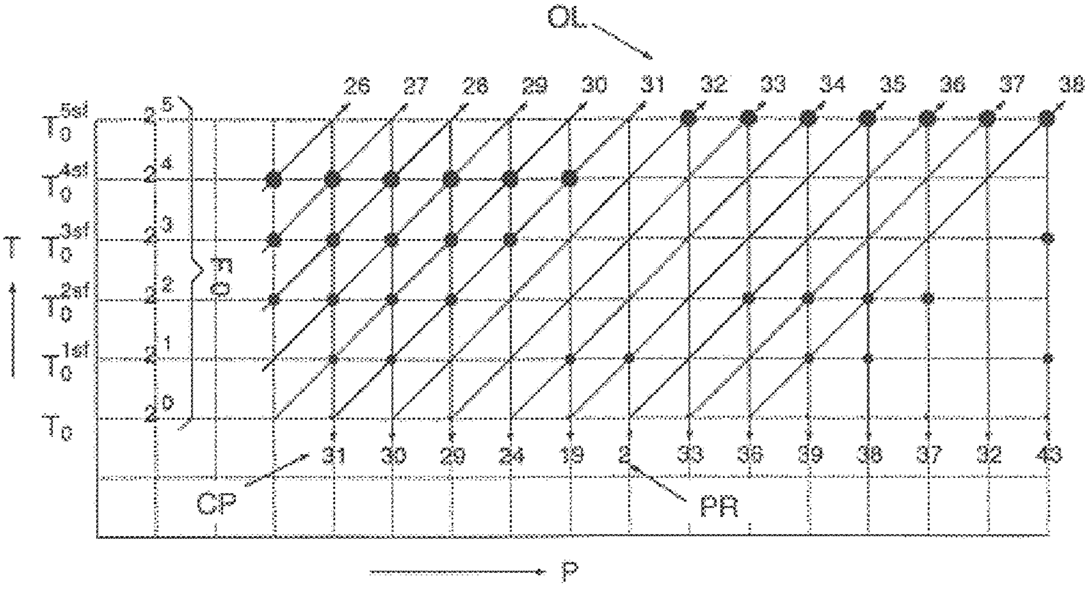
FIG. 2 illustrates motion-compensation for a speed of 6 pixels per field.

In FIG. 2, motion compensation is given for a speed of 6 pixels per field in a time T versus position P diagram. The gray levels shown are the gray levels on the motion vectors. Subfields $2^0$ to $2^5$(this indicate the subfield weight) together constitute a field F0. OL indicates an obtained luminance when tracking the motion. CP indicates a compensation pattern. PR indicates a problem. When a moving object is being observed, the eyes start tracking motion in the direction of the shown motion vectors. The luminance observed on exactly one position on the retina corresponds to the luminances generated by the subfields of these pixels that are located on the motion vector. Thus, more pixels contribute to the total gray-level of one position on the retina that is being observed during motion tracking. Motion compensation tries to map all the subfields of various pixels on the motion vector in a way that all contributions from these subfields and pixels result in the required gray-level, i.e., the gray-level that has to be displayed for one pixel. The displayed gray-level for one pixel in a certain field is the gray-level that is visible on the motion vector.

Figure 3A:
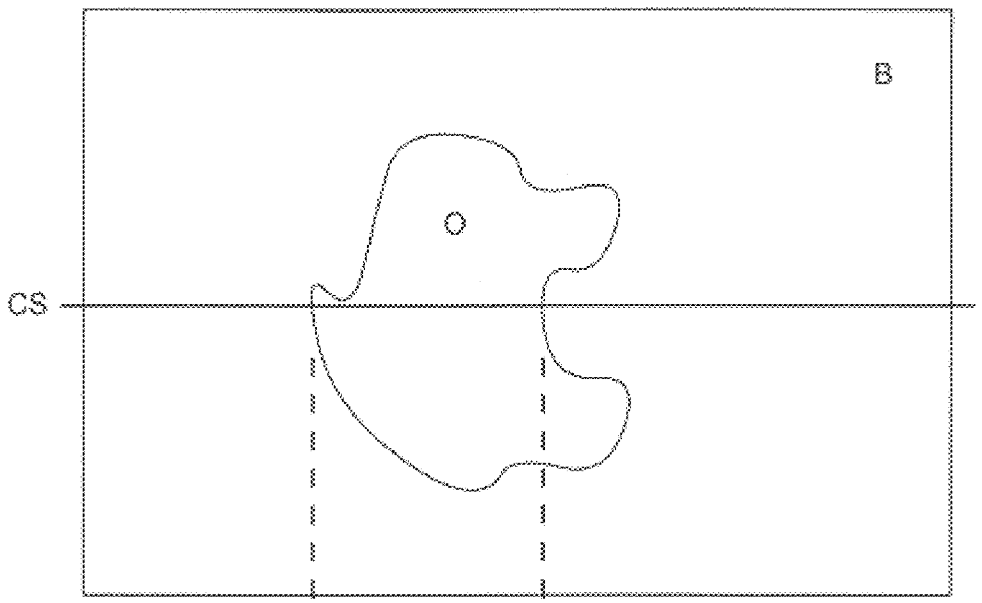
Figure 3B:
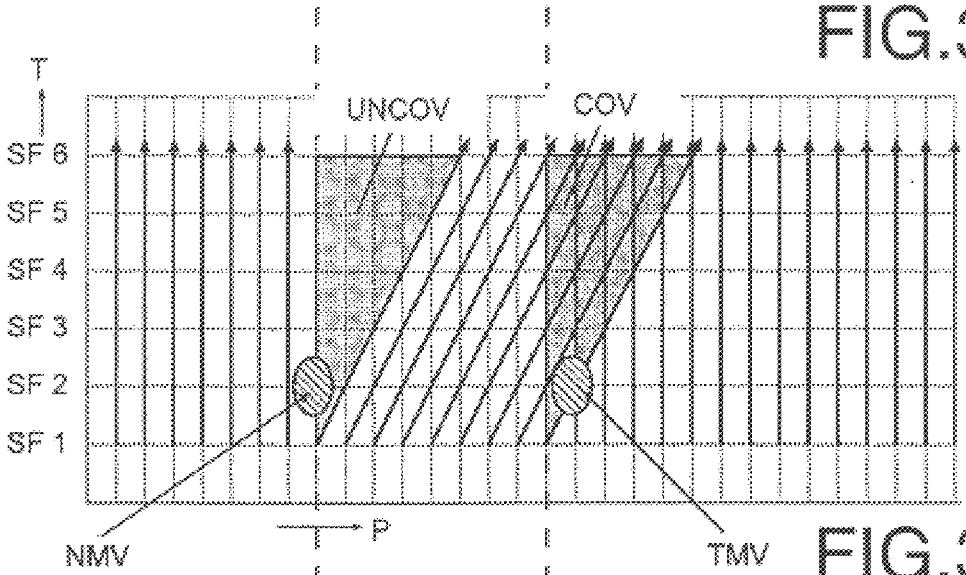
Figure 3C:
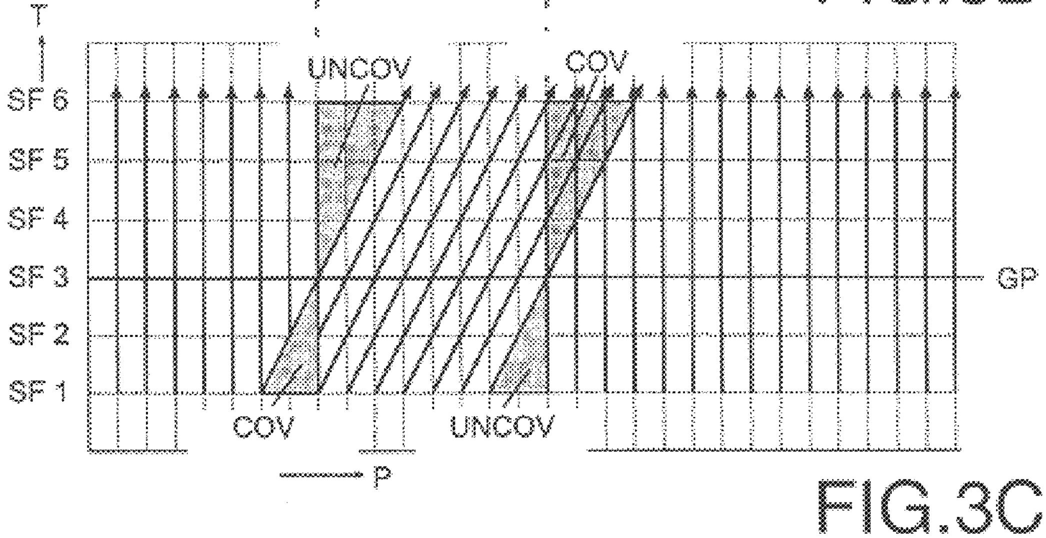

The problem that must be solved, arises due to a spatial change of the motion Vector. i.e., an object is for instance moving over a static background. This is also called the area of covering and uncovering. FIGS. 3A–3C illustrate the problem to be solved due to a spatial change of the motion vectors. FIG. 3A shows a moving object O with a speed of 6 pixels per field on a static background B with a speed of 0 pixels per field. CS indicates the cross section that is considered. Thus, two velocities are present: the background B is for instance static and has no velocity and the object O is moving with a certain speed and in a certain direction. On the edges of this speed change two situations can occur. First, more than one motion vector (TMV: two motion vectors present) is including a subfield of a pixel, which result in an overlapping area or an area of covering (cov) as indicated in FIG. 3B. The second situations is that no motion vectors (NMV) are present at some other subfields of certain pixels, which has been indicated in the same FIG. 3B with a gap, also called an area of uncovering (uncov). The later situation is the easiest to explain, and from that, covering can also be understood.

In case of uncovering, the motion vectors divert each other so that from some pixels, some subfields do not contribute to the gray-scale that is observed. For instance, an object is moving over a background as shown in FIG. 3B. At the front edge of the object the motion vectors divert which is indicated as an area of uncovering (uncov), i.e., the object is moving away from the background, and thereby uncovering the background. At subfield SF1 all motion vectors are shown starting at the pixel positions, but one subfield later (at subfield SF2), there is one pixel that has no motion vector. At the back edge of the object the motion vectors cross each other, indicated with an area of covering (cov), i.e., the object is covering the background. At subfield SF1 all motion vectors are shown starting at the pixel positions, but one subfield later (at subfield SF2), there is one pixel that has two motion vector at the same pixel. This situation is similar to "halo", the covering and uncovering of objects and background. The "halo" that is present indicates the situation that the motion vectors that are estimated are not correct, a larger area than the object itself has a motion vector with the same size and direction as the object itself. The motion vectors have a positional error, i.e. the boundary of the spatial speed change is not correct.

The motion vector field does not include exactly the object, but sometimes also some of the background. But even if this is not the case, it cannot be expected that these vector fields are always exactly present on the boundaries of moving objects, so, these situations should be dealt with. For example, the background has one gray-scale (white) with some small detail in it (e.g., lines and numbers). The uncovered areas indicated in FIG. 3B are very visible as dark lines that indicate the change in speed around the object.

In FIG. 3B, it was assumed that the motion vectors that were estimated started at the first subfield. In FIG. 3C, a similar situation has been drawn, the same motion vectors are shown, but is assumed here that the motion vector of the same pixel has a gravity point GP (reference point) at subfield SF3. These situations differ in the aspect that in the later situation both a covered and uncovered are present simultaneously. At this gravity point the subfield which is shown is not affected by the compensation of the motion vector itself. When the motion vector is wrong, for instance due to "halo" the position is wrong, this subfield does not contribute to the visible error in gray-scale. Thus, when in FIG. 3C, subfield SF3 generates the MSB subfield, this subfield does not contribute to the error, and the contribution to the gray-scale is the largest (in case this subfield for that pixel is on). This aspect is not discussed here in more detail and does not influence the solution that is necessary in case of covering and uncovering.

Figure 4A:
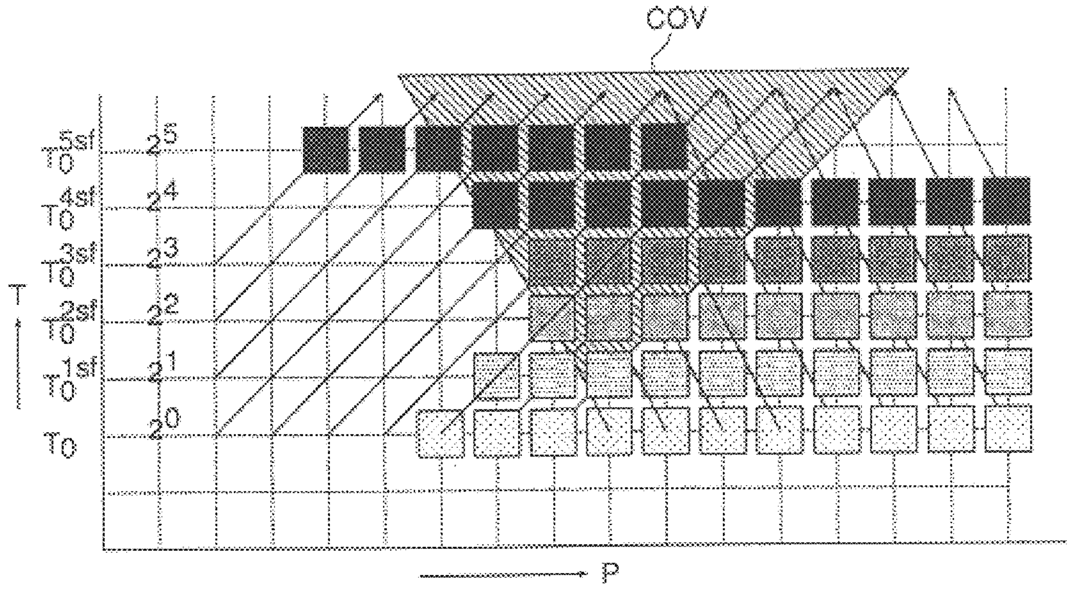
Figure 4B:
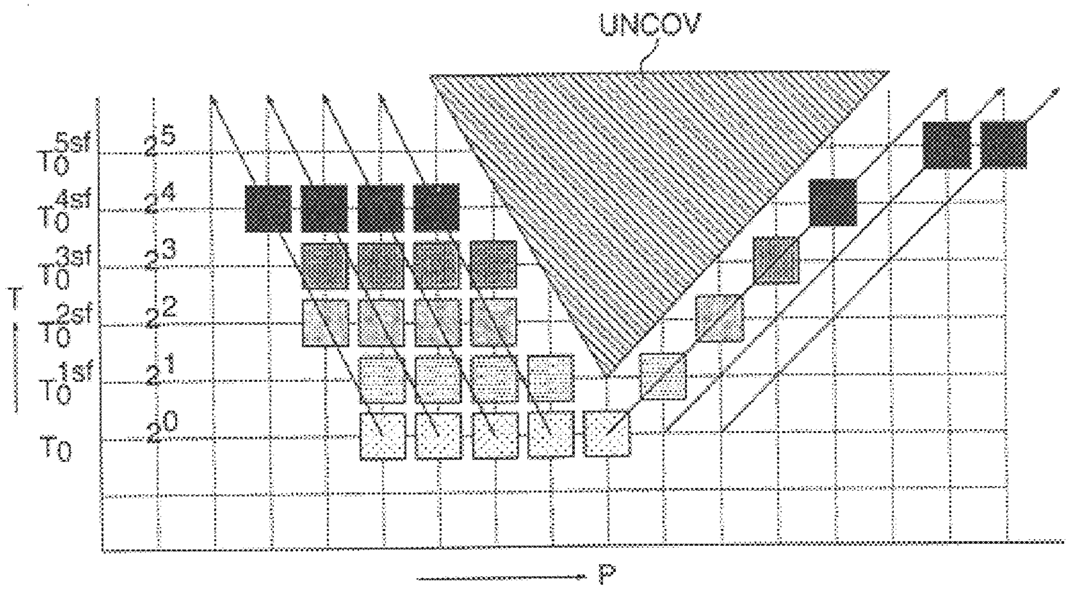

In FIGS. 4A and 4B, an example is shown of two objects in which the motion vectors changes on the edge of both objects. In this case there is also a luminance change present close-by this edge from 31 to 32. Both the covered and uncovered area can be treated similar as long as the covered area is considered to be an empty space that has to be filled in.

In FIGS. 5A 1/2–5C 1/2 both situations are shown: in the figures numbered with a 1, the uncovered area uncov (diverging motion vectors) is shown, and in the figures numbered with a 2, the covered area cov (converging motion vectors) is shown. Three situations can be distinguished:

1. A change in speed on without a change in luminance. This situation can occur when the motion vector of a object extends beyond the object itself and the background of the object has one luminance. This situation is shown in FIG. 5A 1/2.
2. A change in speed on with a small change in luminance. This situation can occur when the motion vector of an object extends beyond the object itself and the background of the object has a small change in luminance. The problem with PDPs is that a small change in luminance can have a large impact on the distribution of the luminance over the subfields. This situation is shown in FIG. 5B 1/2.
3. A change in speed with a large change in luminance. There is for example a lot of detail in the background or the change in speed occurs on the edge of the object, and thereby the luminance changes considerably. This situation is shown in FIG. 5C 1/2.

Several methods can be used to overcome this problems some are more difficult to implement than others and the effectiveness of these methods also differ. The methods can be divided roughly into two groups: methods that can be applied to individual subfields and methods that must be applied to the original (uncompensated) video data. Each method will be described and for each of the situations shown in FIG. 5A 1/2–5C 1/2., the problems will be given. The following solutions are available:

1. Fill in the uncovered area with the luminances from right to left or vice versa. (or up down, as the solutions described for the horizontal direction can be applied also in the vertical direction). For the three situations sketched in FIGS. 5A1–5C1, this seems a good method. One of the difficulties is from which direction the luminances must be taken that must be filled in. If one fills it in from the left as shown in the FIGS. 6A1–6C1, the luminance of the left side in FIG. 6A1 is extended (to the right). Whereas the darker area extends to the left when one fills it in from the right as shown in FIG. 7A1. A problem appears when there is some small detail (a small vertical line over the display). When the wrong direction is taken, this detail can be made more visible (a thicker line on the display) as shown in FIG. 7B1. As regards the covered area (shown in the figures having a 2 at the end of the number of the figure), the same solution can be applied as for the uncovered area, as after emptying the covered area, an uncovered area remains. This latter remark also holds for the other methods described herein below. This method 1 is preferred for the uncovered area.
2. Fill in with the subfield from both sides. It is possible to switch all subfields on that are on at the left or right side of the uncovered area, which is shown in FIGS. 8A1–8C1. So, an OR function is applied: in the (un) covered area, a subfield is switched on if it is on at the left-hand side and/or if it is on at the right-hand side of the (un)covered area. This may not seem to be a solution that is apparent but when a covered area is a subfield of one pixel it may have two motion vectors, and each of the values from the video data that is projected on these motion vectors can have one of those subfields on. This solution is preferred now for covered areas and it does not seem to introduce artifacts although this is not proven (it is no problem on the test images as seen so far). This methods does hardly give any dark spots that can be present with the other methods when the motion vectors are wrong, but it should result in bright spots.

3. Fill in the uncovered area with the luminances from left and right. One can fill in from both directions at the same time. For instance at FIG. 5C1, you can fill in the subfield To$^{4sf}$ pixels from left to right, and at the same time 3 pixels from right to left. Thus, in this case the left three subfields are on and the right ones from the uncovered area are off. This reduces the problem a bit from the small detail as given in 1. It also solves the problem from which direction you have to fill in the uncovered area.
4. Fill in the uncovered area with the luminances from the direction of the lowest speed (or the highest speed). If we have an object (for instance a person) moving over a static background, the uncovered area appears at the back edge of the object (the left side of the person in case she moves to the right). The object with the lowest speed (the background) is the object that is uncovered (an uncovered area is appearing). Thus, this is the luminance that must be filled in, resulting in the subfields that must be turned on, from the left to the right (in this case). When a panning scene is considered the background is moving (panning) and the object that is being tracked might have a velocity that is lower than the background. The uncovered area has a higher velocity in this case than the object that is moving away. In case of covering, it is just the other way around.
5. Fill in the uncovered area with the average of the luminances of the pixels of left and right. For example, in FIG. 11Cl, the average of the luminance of the left and right pixel of the uncovered area is $^{29+30}$ $^{50}/_{2}$=39.5 which is rounded to 39. The difficulty that arises is that there are some subfields of some of the pixels already filled in (the uncovered area is triangular shaped). Thus, the luminances of the subfield that has already be filled in by the motion compensation must be subtracted from the actual average that is required in the uncovered area. From the first column that has to be filled in subfield weight 20 has already be given away, thus the rest (38) is spread over the other subfields (32+4+2). This is also repeated for the other columns of the uncovered area. The input video data of the pixels left and right of the uncovered area (29 and 50) both had the subfield with the weight of (16) in common. This subfield is not appearing when the uncovered area is filled in!
6. Fill in the uncovered area with the average of the luminances of the subfields of left and right. For each subfield of the two input video data, the average between them can be calculated, and added to the corresponding pixels in the uncovered area (method that is used right now). Thus, if a subfield from both pixels are on, the average is that subfield. However, when only one pixel has that subfield on, a value of half of that subfield weight is taken. For example from FIG. 12C1, the average of the subfields are: $(2^0+0)/2+(2^2+0)/2+(2^4+2^4)/2+(2^5+0)/2+(2^3+0)/2+(2^1+0)/2=0.5+2^1+2^4+2^4+2^2+2^0$. The strange situation occurs that a subfield with the same weight ($2^4$) has to be switched on twice, which is not possible. Instead, this is solved by giving an overflow, and therefore, a subfield with the weight $2^5$ is switched on. But the subfield with weight of $2^4$ that both pixels had in common is not switched on.
7. Median filtering on a subfield basis (weight of the subfields of neighbor pixels). To reduce the problem of small detail, a median filtering operation can be performed on the subfields (or input pixel data). The median of the subfields can be calculated for the two pixels left and right from the uncovered area and one or more neighbor pixels. It is also possible to assign an extra weight factor in the median filtering to the most important pixels. The same operation can be done on the video data itself (not per subfield). In the example given here, the median filter that was applied was performed on the input video subfields. The pixel left and right had a weight of 2 and the second pixel on the left had a weight of 1(1:2:2), this to obtain an odd number of subfields for the median filter. Other weights are possible. When this is applied on FIG. 13B 1/2, the subfield values can be calculated that have to be filled in. Two subfields with the weights $2^5$ and $2^4$ are calculated according to $(2^5,0,0,2^5,2^5)$ and $(0,2^4,2^4,0,0)$. When those values are put in the right order it results in that subfield $2^5$ is switched on and $2^4$ is not.
8. Slowly changing speed, FIGS. 14A 1/2–14C 1/2. It is possible to create an area in which the speed is changed in small steps until the next speed level is reached. What happens in this case is that you have to fill in the uncovered areas that are appearing with one of the other methods.
9. Slowly changing luminance, FIGS. 15A 1/2–15C 1/2. The luminance is slowly changed in a way that when the subfield that are not in common are switched on or off in small steps.
10. Creating a transition area with the average of the luminances from left and right, FIGS. 16A 1/2–16C 1/2. A larger area is created in which the motion vectors have the average speed from both sides. The idea is that when "halo" is present, the motion vectors are extending beyond the object and when the motion vectors from these vectors are applied, the motion compensation is applied for the wrong speed. This results in artifacts that are as severe as, as the motion artifacts that would be present in the uncompensated object. The motion artifacts depend on the changes in gray-levels that are present in this area. When the average speed is used for motion compensation and "halo" is present the artifacts that appear are less severe, and on the other hand when there was no "halo", still the artifacts are reduced in some manner.

The uncovered area can arise horizontally as well as vertically, thus, this operation must also be performed in that way. In the claims, "neighboring" is thus not limited to horizontally neighboring.

What kind of requirements can be defined to fill in the uncovered areas? It was already shown above that due to "halo", the motion vector field is not perfect. So the first requirement is that uncovered area that is filled in must be robust against errors of covering and uncovering, which means that the transition of the motion vectors can have a positional error. Thus, if the uncovered area is filled in it is advantageous to fill in gray-levels that do not result in large distortions in gray-level if the position of the motion vectors (transition of the speed) would be wrong. In most of the FIGS. 6 to 13, at the top of each figure, the gray-level is given that are observed for both motion vectors (0 and 6pixels per field) that exist on the left and right side of the (un)covered areas. Only in FIGS. 9A2–9C2, the speeds of −2 and 6 pixels per field are shown without indicating the gray-levels. One thing is important to notice and the second requirement can be conducted from this: When a subfield is switched on all the time, the motion artifacts cannot be caused by this subfield, i.e. all motion vectors that are drawn through such a subfield always contribute in the same way to the observed gray-level (the weight of the subfield). In other words, no speed can be determined from a plane with one gray-level. Thus, if the input video data of two pixels have a mutual subfield on, this subfield must always be filled in the uncovered area! Two methods that were described to fill in the uncovered area do not fulfill this requirement, and that are the methods 5 and 6. These methods calculate the average of the pixel or subfield data on both sides of the uncovered area.

To conclude, it is possible to give some criteria that can be used to select the best method for filling in the transition region where a change of speed occurs. All methods give the same result when on both sides of the uncovered area or covered area the same luminance is present.

1. The complexity of implementation can be important when the implementation is concerned. The two methods that fill in with the subfields from either the left or right side, Method 1, or from the direction with the lowest speed, Method 4, are the easiest to implement. In case of an uncovered area you can choose from which side you copy the subfields to these positions, and in case of a covered area you can prevent to write the subfield of a pixel twice.
2. Consistency, i.e. whether subfields are affected that are common at both sides of the transition region. For both methods 6 and 5, the situation can occur that due to the average operation, a subfield that is on at both sides of the uncovered area or covered area do not have to be on in the uncovered or covered area. This results in a more sensitivity for errors in the position of the change in motion vector. All other methods score equally well in this aspect.
3. Sensitivity to small detail or noise. When small detail is present on one of the pixels to the left or right of an edge, it can result in a stretch of this edge when the luminance of this detail is filled in the uncovered area. An example of this can be seen in FIG. 7B (left). There is a pixel value of 32 present whereas the rest of the data around this pixel is 29. This can indicate the presence of small detail (a small line) or noise. This value is filled in the uncovered area to the left and is, therefore, more pronounced.
4. Whether dark or bright spots do occur more often. Due to the fact that the subfields that are either on at the left side of the uncovered area or covered area or at the right side, are switched on in the uncovered or covered area. This transition region will generally brighter (in case of a luminance change). It is not really clear whether brighter or darker areas are more disturbing.
5. Positional errors, i.e. the sensitivity for errors in the exact position in the transition of the motion vector. When the subfields are filled in from one side, the sensitivity for errors in the position of the transition of the motion vectors become less for the error in the position from that one side. In case of "halo" the motion vectors extend beyond the object. When you fill in from the outside of the object, the error caused by the "halo" becomes less. Question is if we know if there is "halo" around an object?
6. Sensitivity for subfield changes. A problem that remains for all methods are the sensitivity for small detail as can be seen in the FIGS. for filling in the uncovered area in the FIGS. 6 to 15. When you have compensated for a certain speed, you create artifacts for another speed at those combinations of gray-scales that are already sensitive for motion artifacts. There is no way of solving this except of preventing those critical gray-scales to appear around the uncovered areas.

| property | 1 | 2 | 3 | 4 | 5 | 6 | 7 | 8 | 9 | 10 |
|---|---|---|---|---|---|---|---|---|---|---|
| Complexity | ++ | + | 0/+ | ++ | 0 | 0 | 0 | − | − | ? |
| subfield consistency | + | + | + | + | − | − | + | + | ? | ? |
| Positional errors | 0 | 0 | 0 | 0 | − | − | 0 | ? | ? | ? |
| sensitivity to noise | − | − | 0 | − | − | − | + | ? | ? | ? |

Table 1. Comparison of all methods; 1 left or right, 2 both directions, 3 OR'ed luminance left and right; 4 direction of lowest speed, 5 average pixel value, 6 average subfield values, 7 Median filtering; 8 slowly, changing speed, 9 slowly changing luminance, 10 average speed.

To implement the invention, first the motion vector has to be determined and also the covered and uncovered areas. These areas can only result from spatial changes in velocities, i.e. at the border of the motion vector field. This change in speed can result in an covered and uncovered area. Once this area is determined, one of the fore mentioned methods can be used to fill in this covered or uncovered area.

The first step is to determine which areas are covered or uncovered areas. Motion compensation tries to map all subfields from one pixel on the motion vector. Thus, the subfields for one pixel are spatially displaced which is determined by the equation $\Delta x_n = v.\Delta t_n$, with $\Delta x_n$, being the displacement for spatial position x in subfield n, v the speed of the motion vector, and $\Delta t_n$ the time difference between the beginning of the frame time and the moment at which subfield n is generated. If a spatial change in speed is present, the displacement between position x and x+1 changes and an area of covering or uncovering can arise. To detect an area of covering or uncovering for a subfield, subtract the displacement for position $\Delta(x+1)_n - \Delta x_n$, this gives the size of the area of covering or uncovering. In case the difference is negative an area of covering is present, else an area of uncovering is found. The area can be filled in with one of the proposed methods. The area runs from $x+\Delta x_n$ to, $x+1+\Delta(x+1)_n$. The 2D implementation can be found in the same way, but than for the horizontal and vertical speed simultaneously.

Figure 17:
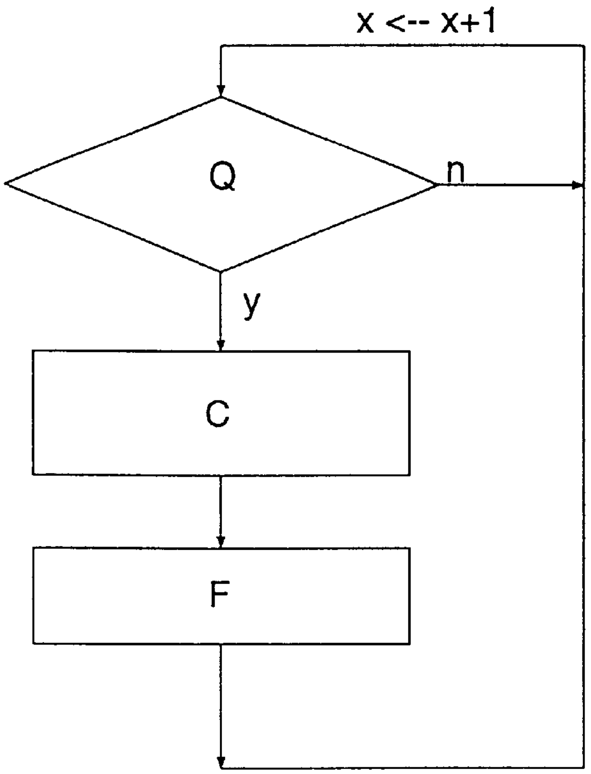
FIG. 17 is a flow-chart to fill in the areas of covering and uncovering.

FIG. 17 shows a flow chart of how to fill in the areas of covering and uncovering. At Q, it is examined whether in a given subfield, there is a change in speed between horizontal position x and horizontal position x+1. If no, the next pixel is examined ($x \leftarrow x+1$). If yes, at C the size of the area of (un)covering is calculated, and at F the area of (un)covering is filled in. Thereafter, the next pixel is examined ($x \leftarrow x+1$).

Figure 18:
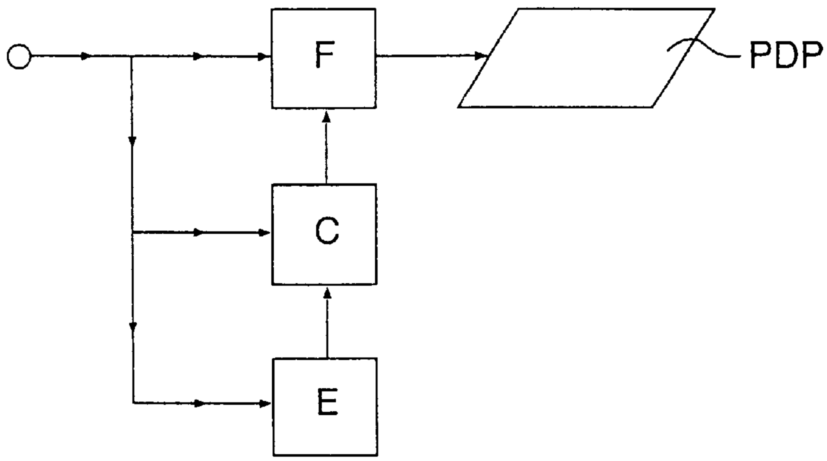
FIG. 18 shows an embodiment of a subfield-driven display apparatus in accordance with the present invention.

FIG. 18 shows an embodiment of a subfield-driven display apparatus in accordance with the present invention. An input image signal is applied to a filling unit F, a calculating unit C, and a examining unit E that operate as described above with reference to FIG. 17. In addition, the filling unit F carries out a motion compensation when motion is present, to output a motion-compensated image signal.

The filling unit F just passes the input image signal when no motion is present. The examining unit E controls the calculating unit C. The calculating unit C controls the filling unit F. An output of the filling unit F is applied to a subfield-driven display device PDP.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. While throughout this text, plasma display panels are used as an example to explain the invention, the invention can also be used with any other type of subfield-driven display, such as a digital mirror device (DMD). The use of the word "field" does not necessarily imply that interlaced fields are used, as interlace is not an issue in this invention.

What is claimed is:

1. A method of driving a subfield-driven display (PDP), the method comprising the steps of:

examining (E) for a position in a subfield whether a first motion vector for the position differs from a second motion vector for a neighboring position to determine whether uncovering or covering is present;

if uncovering or covering is present, calculating (C) a size of an area of covering and uncovering; and if uncovering or covering is present, filling (F) in the area of covering and uncovering.

2. A method as claimed in claim 1, wherein said filling step (F) includes the step of filling in with values from one side of the area.

3. A method as claimed in claim 1, wherein said filling step (F) includes the step of filling in with values from both sides of the area.

4. A method as claimed in claim 1, wherein said filling step (F) includes the step of filling one part of the area in with values from one side of the area, and filling another part of the area in with values from another side of the area.

5. A method as claimed in claim 1, wherein said filling step (F) includes the step of filling in with an average of values from both sides of the area.

6. A method as claimed in claim 1, wherein said filling step (F) includes a median filtering step.

7. A method as claimed in claim 1, wherein said filling step (F) includes creating a transition area with average values from both sides of the covering or uncovering area.

8. A subfield-driven display apparatus, comprising:

a subfield-driven display device (PDP); and a device (E, C, F) for applying image signals to the subfield-driven display device (PDP), the device (E, C, F) including:

means for examining (E) for a position in a subfield whether a first motion vector for the position differs from a second motion vector for a neighboring position to determine whether uncovering or covering is present; and means for if uncovering or covering is present, calculating (C) a size of an area of covering and uncovering, and filling (F) in the area of covering and uncovering.

9. A method of driving a subfield-drive display (PDP), the method comprising:

for at least one pixel position, examining (E) whether a covering area is present and whether an uncovering area is present, the covering area being indicative of a presence of two motion vectors in at least one subfield, the uncovering area being indicative of an absence of a motion vector in at least one subfield;

if the covering area is present, calculating (C) a size of the covering area and filling in the covering area; and if the uncovering area is present, calculating (C) a size of the uncovering area and filling in the uncovering area.

10. A method as claimed in claim 9, wherein said filling step (F) includes the step of filling in with values from one side of the covering area.

11. A method as claimed in claim 9, wherein said filling step (F) includes the step of filling in with values from one side of the uncovering area.

12. A method as claimed in claim 9, wherein said filling step (F) includes the step of filling in with values from both sides of the covering area.

13. A method as claimed in claim 9, wherein said filling step (F) includes the step of filling in with values from both sides of the uncovering area.

14. A method as claimed in claim 9, wherein said filling step (F) includes the step of filling one part of the area in with values from one side of the covering area, and filling another part of the area in with values from another side of the covering area.

15. A method as claimed in claim 9, wherein said filling step (F) includes the step of filling one part of the area in with values from one side of the uncovering area, and filling another part of the area in with values from another side of the uncovering area.

16. A method as claimed in claim 9, wherein said filling step (F) includes the step of filling in with an average of values from both sides of the covering area.

17. A method as claimed in claim 9, wherein said filling step (F) includes the step of filling in with an average of values from both sides of the uncovering area.

18. A method as claimed in claim 9, wherein said filling step (F) includes creating a transition area with average values from both sides of the covering area.

19. A method as claimed in claim 9, wherein said filling step (F) includes creating a transition area with average values from both sides of the uncovering area.

* * * * *